United States Patent
Tang et al.

(10) Patent No.: US 12,417,314 B2
(45) Date of Patent: Sep. 16, 2025

(54) TASK-AWARE PRIVACY PRESERVATION FOR MULTI-DIMENSIONAL DATA

(71) Applicants: Cornell University, Ithaca, NY (US); Board of Regents, The University of Texas System, Austin, TX (US)

(72) Inventors: Ao Tang, Ithaca, NY (US); Jiangnan Cheng, Ithaca, NY (US); Sandeep Chinchali, Austin, TX (US)

(73) Assignees: Cornell University, Ithaca, NY (US); Board of Regents, The University of Texas System, Austin, TX (US)

( * ) Notice: Subject to any disclaimer, the term of this patent is extended or adjusted under 35 U.S.C. 154(b) by 313 days.

(21) Appl. No.: 18/195,746

(22) Filed: May 10, 2023

(65) Prior Publication Data

US 2023/0367906 A1 Nov. 16, 2023

Related U.S. Application Data

(60) Provisional application No. 63/340,554, filed on May 11, 2022.

(51) Int. Cl.
  *G06F 21/62* (2013.01)
  *G06N 3/0455* (2023.01)
  *G06N 3/084* (2023.01)

(52) U.S. Cl.
  CPC ....... *G06F 21/6254* (2013.01); *G06N 3/0455* (2023.01); *G06N 3/084* (2013.01)

(58) Field of Classification Search
  CPC .. G06F 21/6254; G06N 3/0455; G06N 3/084; G06N 3/048; G06N 3/088
  See application file for complete search history.

(56) References Cited

U.S. PATENT DOCUMENTS 11,023,594 B2  6/2021  Nissim Kobliner et al.
11,232,478 B2  1/2022  Brown et al.
(Continued)

FOREIGN PATENT DOCUMENTS

WO  2013120780 A2  8/2013
WO  2020248149 A1  12/2020
WO  2020248150 A1  12/2020

OTHER PUBLICATIONS

A. Smith et al., "Differentially Private Feature Selection via Stability Arguments, and the Robustness of the Lasso," Journal of Machine Learning Research, vol. 30, Jan. 2013, 30 pages.
(Continued)

*Primary Examiner* — Huan V Doan
(74) *Attorney, Agent, or Firm* — Ryan, Mason & Lewis, LLP

(57) ABSTRACT

A method performed by at least one processing device in an illustrative embodiment comprises applying an input data sample to an encoder of an encoder-decoder network to generate a corresponding latent representation, combining the latent representation from the encoder with noise, applying the combined latent representation and noise to a decoder of the encoder-decoder network to generate an estimated data sample, and outputting the estimated data sample. Respective sets of parameters of the encoder and decoder of the encoder-decoder network are configured based at least in part on an iterative optimization process utilizing a task loss determined from a task function that relates the input data sample to a task output. A given iteration of the iterative optimization process illustratively generates an estimated task output from the estimated data sample, determines a loss measure using the estimated task output, and adjusts one or more parameters using the loss measure.

20 Claims, 9 Drawing Sheets

---

Algorithm 1 Task-aware Algorithm for $\epsilon$-LDP Preservation in General Settings

Require: Privacy budget $\epsilon$ and $Z$
1: Initialize encoder/decoder parameters $\theta_e, \theta_d$ and noise vector $w$
2: for $\tau \in \{0, 1, \cdots, N_{epochs} - 1\}$ do
3:   Update $\theta_e$ and $\theta_d$ with $-(\nabla_{\theta_e}\mathcal{L} + 2\eta\theta_e)$ and $-\nabla_{\theta_d}\mathcal{L}$, respectively, by one or multiple steps
4:   Recompute $\Delta_1 g_e$, and re-sample $w$ from $\text{Lap}^Z(0, \Delta_1 g_e/\epsilon)$
5: end for
6: Return $\theta_e, \theta_d$ and $\Delta_1 g_e$

(56) References Cited

U.S. PATENT DOCUMENTS

| | | | |
|---|---|---|---|
| 2016/0071170 A1 | 3/2016 | Massoulie et al. | |
| 2019/0370334 A1* | 12/2019 | Bhowmick | G06F 40/242 |
| 2021/0365580 A1 | 11/2021 | Klucar, Jr. et al. | |
| 2021/0374605 A1 | 12/2021 | Qian et al. | |
| 2023/0299788 A1* | 9/2023 | Agustsson | G06N 3/084 |
| | | | 341/94 |

OTHER PUBLICATIONS

D. Wang et al., "Empirical Risk Minimization in the Non-interactive Local Model of Differential Privacy," Journal of Machine Learning Research, vol. 21, Sep. 2020, 39 pages.

J. Wang et al., "Not Just Privacy: Improving Performance of Private Deep Learning in Mobile Cloud," Proceedings of the 24th ACM SIGKDD International Conference on Knowledge Discovery & Data Mining, Jul. 2018, pp. 2407-2416.

N. Wang et al., "Collecting and Analyzing Multidimensional Data with Local Differential Privacy," arXiv:1907.00782v1, Jun. 28, 2019, 12 pages.

Y.-X. Wang et al., "Subsampled Renyi Differential Privacy and Analytical Moments Accountant," Proceedings of the 22nd International Conference on Artificial Intelligence and Statistics (AIStats), Apr. 2019, 10 pages.

X. Xiao et al., "Differential Privacy via Wavelet Transforms," arXiv:0909.5530v1, Sep. 30, 2009, 15 pages.

J. Zhao et al., "Achieving Differential Privacy of Data Disclosure in the Smart Grid," IEEE Conference on Computer Communications, Apr. 2014, 9 pages.

Y, Zhou et al., "VoxelNet: End-to-End Learning for Point Cloud Based 3D Object Detection," IEEE/CVF Conference on Computer Vision and Pattern Recognition (CVPR), Jun. 2018, pp. 4490-4499.

J. C. Duchi et al., "Local Privacy and Statistical Minimax Rates," IEEE 54th Annual Symposium on Foundations of Computer Science, Oct. 2013, pp. 429-438.

F. McSherry et al., "Mechanism Design via Differential Privacy," 48th Annual IEEE Symposium on Foundations of Computer Science, Oct. 2007, pp. 94-103.

A. Ruhe, "Perturbation Bounds for Means of Eigenvalues and Invariant Subspaces," BIT Numerical Mathematics, vol. 10, Sep. 1970, pp. 343-354.

T. Wang et al., "End-to-End Text Recognition with Convolutional Neural Networks," 21st International Conference on Pattern Recognition, Nov. 2012, pp. 3304-3308.

I.-C. Yeh et al., "Building Real Estate Valuation Models with Comparative Approach through Case-based Reasoning," Applied Soft Computing, vol. 65, Apr. 2018, pp. 260-271.

Y. Nie et al., "A Utility-Optimized Framework for Personalized Private Histogram Estimation," IEEE Transactions on Knowledge and Data Engineering, vol. 31, No. 4, Apr. 2019, pp. 656-669.

J. Casey, "A Treatise of the Analytical Geometry of the Point, Line, Circle, and Conic Sections," Dublin University Press Series, 1893, Accessed from University of Michigan Historical Math Collection,https://quod.lib.umich.edu/cgi/t/text/text-idx?c=umhistmath;cc=umhistmath;rgn=main;view=text;idno=ABR0988.0001.001, May 4, 2023, 501 pages.

G. H. Dunteman, "Principal Components Analysis," Quantitative Application in the Social Sciences, vol. 69, 1989, Extract Only, 14 pages.

C. Dwork et al., The Algorithmic Foundations of Differential Privacy, Foundations and Trends in Theoretical Computer Science, 2013, Full text available at: http://dx.doi.org/10.1561/0400000042, Extract Only, 26 pages.

Y. Zhang et al., "Understanding Bag-of-Words Model: A Statistical Framework," International Journal of Machine Learning and Cybernetics, vol. 1, Aug. 28, 2010, 16 pages.

L. Wasserman et al., "A Statistical Framework for Differential Privacy," arXiv:0811.2501v2, Oct. 2, 2009, 42 pages.

J. Von Neumann, "Some Matrix Inequalities and Metrization of Matrix Space," Tomsk. Univ. Rev. 1, 286-300 (1937). Reprinted in Collected Works, vol. 4, Pergamon Press, New York, 1962. Citation Only.

W. N. Street et al., "Nuclear Feature Extraction for Breast Tumor Diagnosis," Center for Parallel Optimization, Computer Sciences Technical Report #1131, Dec. 28, 1992, 10 pages.

J. Cheng et al., "Task-aware Privacy Preservation for Multidimensional Data," arXiv:2110.02329v3, Aug. 8, 2022, 17 pages.

J. Cheng et al., "Task-aware Privacy Preservation for Multidimensional Data," arXiv:2110.02329v1, Oct. 5, 2021, 20 pages.

J. Cheng et al., "Task-aware Privacy Preservation for Multidimensional Data," Proceedings of the 39th International Conference on Machine Learning, Jun. 28, 2022, 17 pages.

Q. Chen et al., "Differentially Private Data Generative Models," sevarXiv:1812.02274v1, Dec. 6, 2018, 18 pages.

J. Acharya et al., "Context-Aware Local Differential Privacy," arXiv:1911.00038v2, Jul. 27, 2020, 24 pages.

J. Acharya et al., "Context-Aware Local Differential Privacy," Proceedings of the 37th International Conference on Machine Learning, Jul. 2020, 11 pages.

M. Abadi et al., "Deep Learning with Differential Privacy," arXiv:1607.00133v2, Oct. 24, 2016, 14 pages.

M. S. Alvim et al., "Differential Privacy: On the Trade-off between Utility and Information Leakage," arXiv:1103.5188v3, Aug. 25, 2011, 30 pages.

B. Amos et al., "Differentiable MPC for End-to-end Planning and Control," Advances in Neural Information Processing Systems, vol. 31, Dec. 2018, 12 pages.

P. C. M. Arachchige et al., "Local Differential Privacy for Deep Learning," arXiv:1908.02997v3l, Nov. 9, 2019, 16 pages.

Z. Bu et al., "Deep Learning with Gaussian Differential Privacy," Harvard Data Science Review, Sep. 30, 2020, 31 pages.

J.-W. Chen et al., "Perceptual Indistinguishability-Net (PI-Net): Facial Image Obfuscation with Manipulable Semantics," IEEE/CVF Conference on Computer Vision and Pattern Recognition (CVPR), Jun. 2021, pp. 6474-6483.

J. Cheng et al., "Data Sharing and Compression for Cooperative Networked Control," Advances in Neural Information Processing Systems, Sep. 29, 2021, 12 pages.

J. Cortes et al., "Differential Privacy in Control and Network Systems," IEEE 55th Conference on Decision and Control, Dec. 2016, pp. 4252-4272.

F. K. Dankar et al., "Practicing Differential Privacy in Health Care: A Review," Transactions on Data Privacy, vol. 6, No. 1, Apr. 1, 2013, pp. 35-67.

Apple Differential Privacy Team, "Learning with Privacy at Scale," https://machinelearning.apple.com/research/learning-with-privacy-at-scale, Dec. 2017, 25 pages.

B. Ding et al., "Collecting Telemetry Data Privately," 31st Conference on Neural Information Processing Systems, Dec. 2017, 10 pages.

P. L. Donti et al., "Task-based End-to-end Model Learning in Stochastic Optimization," 31st Conference on Neural Information Processing Systems, Dec. 2017, 11 pages.

D. Dua et al., "UCI Machine Learning Repository," http://archive.ics.uci.edu/ml, University of California, School of Information and Computer Science, Accessed May 1, 2023, 2 pages.

C. Dwork et al., "Calibrating Noise to Sensitivity in Private Data Analysis," Theory of Cryptography, Lecture Notes in Computer Science, vol. 3876, Mar. 2006, 20 pages.

U. Erlingsson et al., "RAPPOR: Randomized Aggregatable Privacy-Preserving Ordinal Response," Proceedings of the 2014 ACM SIGSAC Conference on Computer and Communications Security, Nov. 2014, pp. 1054-1067.

A. Friedman et al., "Data Mining with Differential Privacy," Proceedings of the 16th ACM SIGKDD International Conference on Knowledge Discovery and Data Mining, Jul. 2010, 10 pages.

Q. Geng et al., "The Optimal Noise-Adding Mechanism in Differential Privacy," IEEE Transactions on Information Theory, vol. 62, No. 2, Feb. 2016, 28 pages.

(56) References Cited

OTHER PUBLICATIONS

L. Gondara et al. "Differentially Private Small Dataset Release Using Random Projections," Proceedings of the 36th Conference on Uncertainty in Artificial Intelligence (UAI), PMLR vol. 124, Aug. 2020, 10 pages.

M. Hardt et al., "On the Geometry of Differential Privacy," arXiv:0907.3754v3, Nov. 9, 2009, 27 pages.

M. U. Hassan, "Differential Privacy Techniques for Cyber Physical Systems: A Survey," arXiv:1812.02282v3, Sep. 27, 2019, 46 pages.

G. Hebrail et al., "Individual Household Electric Power Consumption Data Set," https://archive.ics.uci.edu/ml/datasets/individual+household+electric+power+consumption, UCI Machine Learning Repository, University of California, School of Information and Computer Science, Accessed May 1, 2023, 2 pages.

M. Joseph et al., "The Role of Interactivity in Local Differential Privacy," arXiv:1904.03564v2, Nov. 8, 2019, 36 pages.

P. Kairouz et al., "Extremal Mechanisms for Local Differential Privacy," Journal of Machine Learning Research, vol. 17, Apr. 2016, 51 pages.

S. P. Kasiviswanathan et al., "What Can We Learn Privately?" arXiv:0803.0924v3, Feb. 19, 2010, 35 pages.

K. Kenthapadi et al., "Privacy via the Johnson-Lindenstrauss Transform," arXiv:1204.2606v1, Apr. 12, 2012, 24 pages.

Y. Lecun et al., "Gradient-Based Learning Applied to Document Recognition," Proceedings of the IEEE, Nov. 1998, 46 pages.

C. Li et al., "The Matrix Mechanism: Optimizing Linear Counting Queries Under Differential Privacy," The VLDB Journal, Aug. 18, 2015, 25 pages.

C. Liu et al., "Dependence Makes You Vulnerable: Differential Privacy Under Dependent Tuples," Network and Distributed System Security Symposium, Jan. 2016, 15 pages.

R. Liu et al., "FedSel: Federated SGD under Local Differential Privacy with Top-k Dimension Selection," International Conference on Database Systems for Advanced Applications, Mar. 24, 2020, 18 pages.

A. Makhdoumi et al., "Privacy-Utility Tradeoff under Statistical Uncertainty," Fifty-first Annual Allerton Conference, Oct. 2013, 8 pages.

A. Mansbridge et al., "Representation Learning for High-Dimensional Data Collection under Local Differential Privacy," arXiv:2010.12464v3, May 14, 2022, 24 pages.

B. McMahan et al., "Private Online Prefix Sums via Optimal Matrix Factorizations," arXiv:2202.08312v1, Feb. 16, 2022, 23 pages.

H. B. McMahan et al., "A General Approach to Adding Differential Privacy to Iterative Training Procedures," arXiv:1812.06210v2, Mar. 4, 2019, 8 pages.

F. Mireshghallah et al., "A Principled Approach to Learning Stochastic Representations for Privacy in Deep Neural Inference," arXiv:2003.12154v1, Mar. 26, 2020, 15 pages.

U. Muller et al., "Off-Road Obstacle Avoidance through End-to-End Learning," Proceedings of the 18th International Conference on Neural Information Processing Systems, Dec. 2005, 8 pages.

T. Murakami et al, "Utility-Optimized Local Differential Privacy Mechanisms for Distribution Estimation," Proceedings of the 28th USENIX Security Symposium, Aug. 2019, pp. 1877-1894.

M. Nakanoya et al., "Co-Design of Communication and Machine Inference for Cloud Robotics," Robotics: Science and Systems, Jul. 2021, 10 pages.

N. Papernot et al., "Semi-supervised Knowledge Transfer for Deep Learning from Private Training Data," arXiv:1610.05755v4, Mar. 3, 2017, 16 pages.

N. Phan et al., "Differential Privacy Preservation for Deep Auto-Encoders: An Application of Human Behavior Prediction," Proceedings of the Thirtieth AAAI Conference on Artificial Intelligence, Feb. 2016, pp. 1309-1316.

N. Phan et al., "Adaptive Laplace Mechanism: Differential Privacy Preservation in Deep Learning," arXiv:1709.05750v2, Apr. 23, 2018, 13 pages.

N. Phan et al., "Heterogeneous Gaussian Mechanism: Preserving Differential Privacy in Deep Learning with Provable Robustness," arXiv:1906.01444v1, Jun. 2, 2019, 10 pages.

R. Shokri et al., "Privacy-Preserving Deep Learning," Proceedings of the 22nd ACM SIGSAC Conference on Computer and Communications Security, Oct. 2015, 12 pages.

S. Song et al., "Stochastic Gradient Descent with Differentially Private Updates," IEEE Global Conference on Signal and Information Processing (GlobalSIP), Dec. 2013, pp. 245-248.

\* cited by examiner

Algorithm 1 Task-aware Algorithm for $\epsilon$-LDP Preservation in General Settings

Require: Privacy budget $\epsilon$ and $Z$

1: Initialize encoder/decoder parameters $\theta_e$, $\theta_d$ and noise vector $w$
2: for $\tau \in \{0, 1, \cdots, N_{epochs} - 1\}$ do
3:     Update $\theta_e$ and $\theta_d$ with $-(\nabla_{\theta_e}\mathcal{L} + 2\eta\theta_e)$ and $-\nabla_{\theta_d}\mathcal{L}$, respectively, by one or multiple steps
4:     Recompute $\Delta_1 g_e$, and re-sample $w$ from $Lap^Z(0, \Delta_1 g_e/\epsilon)$
5: end for
6: Return $\theta_e$, $\theta_d$ and $\Delta_1 g_e$

FIG. 2

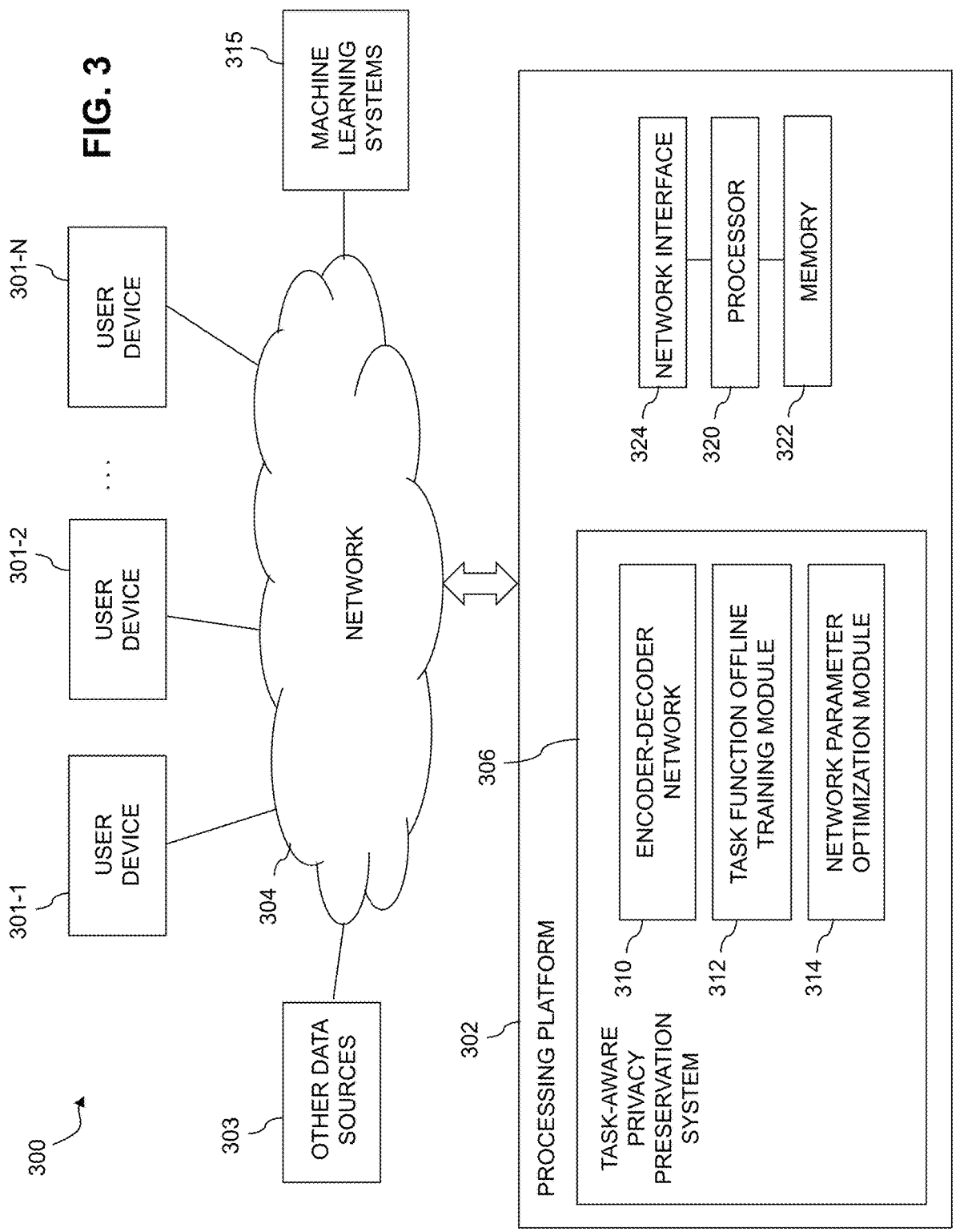

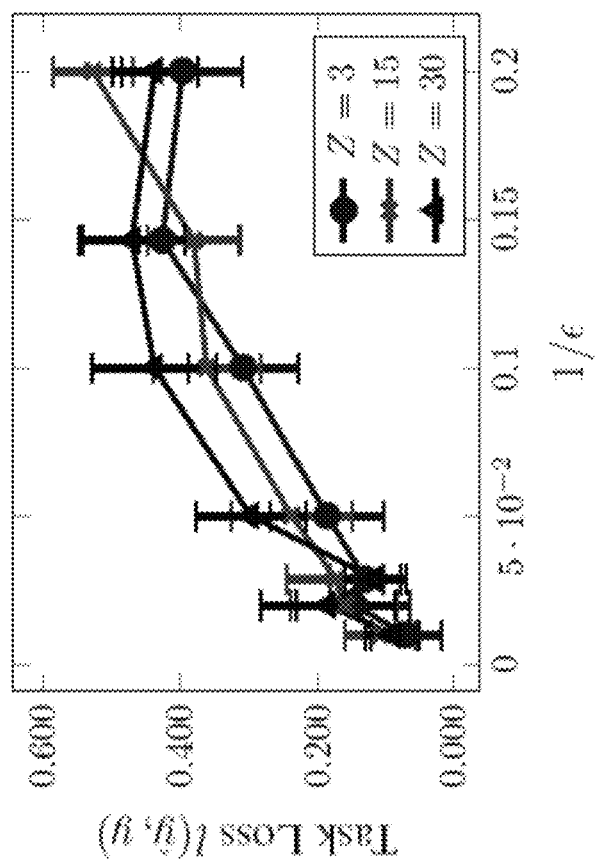
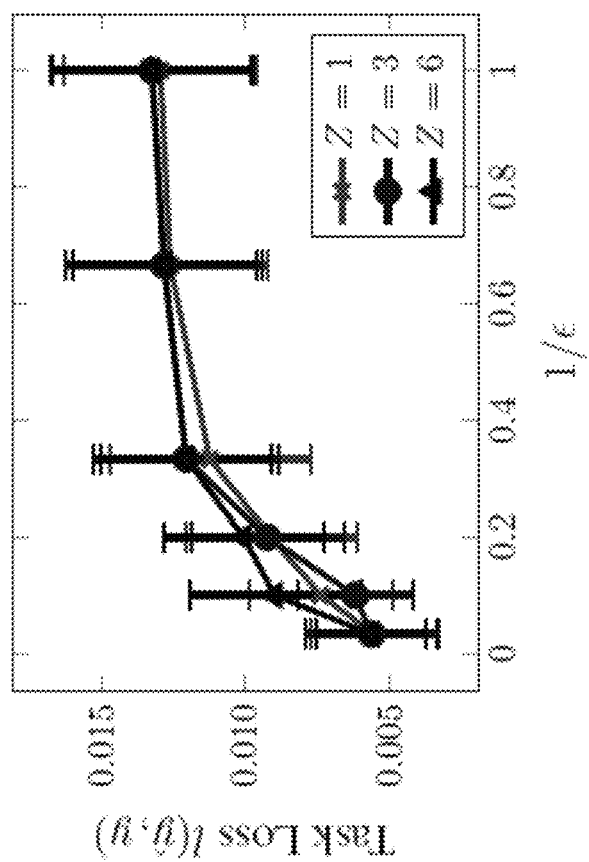
FIG. 8

TASK-AWARE PRIVACY PRESERVATION FOR MULTI-DIMENSIONAL DATA

RELATED APPLICATION

The present application claims priority to U.S. Provisional Patent Application Ser. No. 63/340,554, filed May 11, 2022 and entitled "Task-Aware Privacy Preservation for Multi-Dimensional Data," which is incorporated by reference herein in its entirety.

STATEMENT OF GOVERNMENT SUPPORT

This invention was made with U.S. government support under Grant No. 2133403 and Grant No. 2133481 of the National Science Foundation (NSF). The U.S. government has certain rights in the invention.

FIELD

The field relates generally to information processing systems, and more particularly to techniques for preserving data privacy in such systems.

BACKGROUND

Local differential privacy (LDP) includes privacy preservation techniques that can anonymize user data attributes, such that the resulting anonymized data can be input to machine learning (ML) systems for further processing. However, conventional LDP approaches are largely task-agnostic. For example, such approaches are typically configured to simply inject noise into all data attributes according to a given privacy budget. Such approaches can lead to substantial performance loss in the ML systems that process the resulting anonymized data. Improved techniques are therefore needed for preserving the privacy of data utilized in ML systems and numerous other data processing applications.

SUMMARY

Illustrative embodiments disclosed herein provide techniques for task-aware privacy preservation for multi-dimensional data.

For example, some embodiments disclosed herein configure an encoder-decoder network, which may be implemented as an encoder-decoder neural network or using other types and arrangements of functions and/or neural networks, to learn and anonymize a task-aware latent representation of user data. Unlike conventional LDP approaches, which as indicated above are task-agnostic and often simply inject noise into all data attributes according to a given privacy budget, regardless of what data attributes are most relevant for the ultimate data processing task, illustrative embodiments herein are configured to control the manner in which noise is injected into different data attributes based at least in part on relevance of those attributes to the particular task for which the anonymized data will be used.

Experiments performed on illustrative embodiments as disclosed herein demonstrate that a task-aware privacy preservation approach in accordance with such embodiments significantly improves ultimate task accuracy compared to standard benchmark LDP approaches with the same level of privacy guarantee.

In one embodiment, a method performed by at least one processing device comprises applying an input data sample to an encoder of an encoder-decoder network to generate a corresponding latent representation, combining the latent representation from the encoder with noise, applying the combined latent representation and noise to a decoder of the encoder-decoder network to generate an estimated data sample, and outputting the estimated data sample. Respective sets of parameters of the encoder and decoder of the encoder-decoder network are configured based at least in part on an iterative optimization process utilizing a task loss determined from a task function that relates the input data sample to a task output.

A given iteration of the iterative optimization process in some embodiments illustratively comprises applying an instance of the estimated data sample to the task function to generate an estimated task output, determining a loss measure based at least in part on the estimated task output, and adjusting at least one of the respective sets of parameters of the encoder and decoder based at least in part on the loss measure.

These and other illustrative embodiments include but are not limited to systems, methods, apparatus, processing devices, integrated circuits, and computer program products comprising processor-readable storage media having software program code embodied therein.

BRIEF DESCRIPTION OF THE FIGURES

FIG. 2 shows an example algorithm for task-aware privacy preservation for multi-dimensional data in an illustrative embodiment.

FIG. 3 shows another example of an information processing system configured to implement task-aware privacy preservation for multi-dimensional data in an illustrative embodiment.

FIG. 8 shows plots of experimental results for a task-aware approach in example applications involving real estate valuation and breast cancer detection.

DETAILED DESCRIPTION

Figure 1:
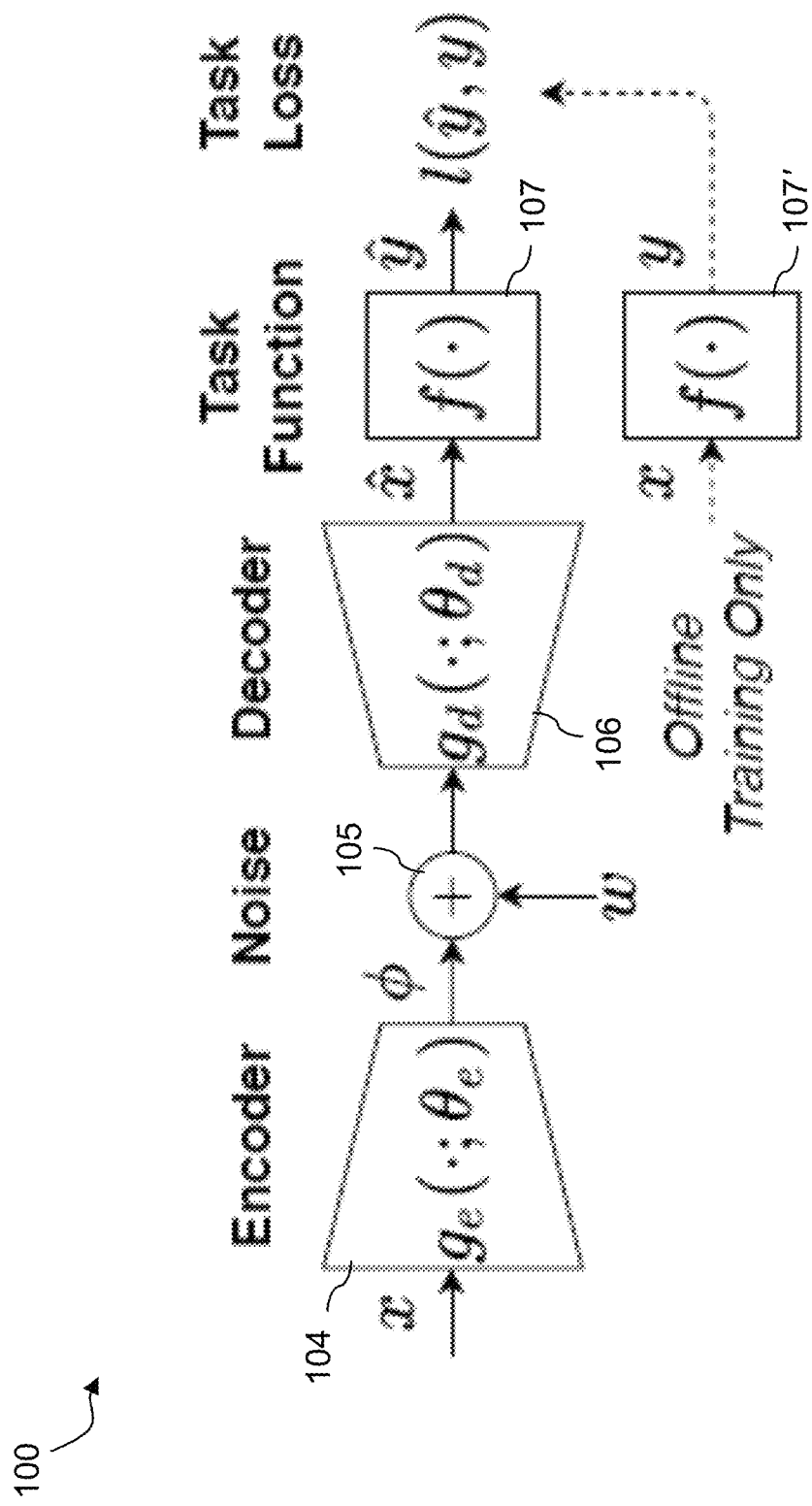
FIG. 1 is a block diagram of an example information processing system configured to implement task-aware privacy preservation for multi-dimensional data in an illustrative embodiment.

Illustrative embodiments can be implemented, for example, in the form of information processing systems comprising one or more processing platforms each comprising at least one computer, server or other processing device, as well as other arrangements of processing devices. A number of examples of such systems will be described in detail herein. It should be understood, however, that embodiments disclosed herein are more generally applicable to a wide variety of other types of information processing systems and associated computers, servers or other processing devices or other components. Accordingly, the term "information processing system" as used herein is intended to be broadly construed so as to encompass these and other arrangements.

As indicated previously, LDP can be adopted to anonymize richer user data attributes that will be input to sophisticated ML tasks. However, conventional LDP approaches are largely task-agnostic and often lead to severe performance loss—they simply inject noise to all data attributes according to a given privacy budget, regardless of what features are most relevant for the ultimate task. Illustrative embodiments disclosed herein significantly improve the ultimate task performance with multi-dimensional user data by considering a task-aware privacy preservation problem. More particularly, illustrative embodiments use an encoder-decoder framework to learn and anonymize a task-relevant latent representation of user data.

As will be described below, some embodiments provide an analytical near-optimal solution for the linear setting with mean-squared error (MSE) task loss, as well as an approximate solution through a gradient-based learning algorithm for general nonlinear cases. Extensive experiments demonstrate that a task-aware approach as disclosed herein can significantly improve ultimate task accuracy compared to standard benchmark LDP approaches with the same level of privacy guarantee.

In recent years, there has been tremendous growth in the volume of available data for ML tasks, leading to increasing emphasis on protecting user privacy. Differential privacy is a state-of-the-art technique for data privacy, and its local variant LDP provides stronger privacy guarantees for individual users without dependence on any trusted third party. In practice, LDP has been successfully deployed for some basic frequency or histogram estimation tasks where raw user data is restricted to an n-bit discrete variable.

It is expected that LDP will be adopted in more complex scenarios (e.g., health care, power grids, Internet of Things) that feature richer user data attributes that feed into more sophisticated downstream ML tasks. In such cases, today's standard task-agnostic LDP approaches have significant drawbacks. For example, consider complex user data that must be anonymized before being passed into a ML task function, such as a neural network classifier for credit scores. A standard approach would be to simply perturb the data by adding artificial noise whose scale depends on the sensitivity of user data (e.g., worst-case variation among a user population) and a given privacy budget, regardless of what ultimate task the anonymized data will be used for. However, as the dimension and variability of user data inevitably grows, today's methods would generally have to increase the scale of noise to provide the same LDP guarantee, even though many data attributes might be highly variable across a user population, but minimally relevant for a task. As a consequence, one often adds excessive noise to all data attributes, which can severely degrade an ultimate task's performance.

To address these and other challenges of conventional practice, illustrative embodiments disclosed herein provide a fundamentally different differential privacy approach, generally referred to herein as a task-aware approach. Such embodiments can significantly improve the performance of ML tasks that operate on multi-dimensional user data while still guaranteeing the same levels of privacy. For example, some embodiments are illustratively configured to characterize the dependence of task performance on various user data attributes, which guides learning of a concise, task-relevant encoding, more generally referred to herein as a "latent representation," of user data. Then, for the same privacy budget, these illustrative embodiments can directly expose and perturb only the task-relevant encoding rather than raw user data, which often allows less noise to be added and thereby substantially improves task accuracy. Advantageously, user privacy in such embodiments can be guaranteed under the same privacy budget according to the post-processing immunity of differential privacy (i.e., one cannot make the output of a privacy algorithm less differentially private without additional knowledge). As such, an adversary cannot decode the anonymized latent representation to reduce the level of privacy.

Some embodiments disclosed herein are illustratively configured to learn and expose only high-valued data attributes and flexibly adjust their signal-to-noise ratio based on their importance to a task. Moreover, when different data attributes are inter-dependent, task-aware LDP preservation is even more promising in that the utilities of the underlying orthogonal bases can be considered through principal component analysis (PCA), instead of utilizing the raw data attributes.

Additionally or alternatively, illustrative embodiments disclosed herein provide task-aware privacy preservation in which the effect of noise perturbation to preserve LDP is effectively considered, based on an encoder-decoder framework. In terms of task-aware privacy preservation, some embodiments illustratively obtain an analytical near-optimal solution for a linear setting and MSE task loss, and additionally or alternatively provide a gradient-based learning algorithm for more general settings. Real-world experiments described herein validate the effectiveness of the task-aware approach. For example, the experiments indicate that the task-aware approach in some embodiments outperforms benchmark approaches on overall task loss under various LDP budgets by as much as 70.0%.

Illustrative embodiments can provide significant advantages relative to conventional approaches. For example, some embodiments do not require additional assumptions on the sensitivity of user data, and yet the task-aware approach achieves a better task performance than standard LDP benchmarks by directly studying the dependencies between the task objective and different attributes of user data. Such embodiments also effectively capture the effect of noise perturbation resulting from privacy requirements, and demonstrate that matrix factorization is not optimal for linear transformation.

Illustrative embodiments are also fundamentally different than conventional deep learning approaches. For example, instead of preserving LDP during the learning process, learning in some embodiments is used as a tool to find the salient representation that improves the task performance under a given privacy budget. In other words, instead of perturbing the gradient for back-propagation, illustrative embodiments perturb the representation to guarantee LDP. Furthermore, some embodiments disclosed herein don't specifically deal with privacy preservation during the offline training process, which requires some ground truth user data (e.g., from a small set of consenting volunteers). However, LDP of user data is guaranteed after a trained model is deployed online.

Aspects of illustrative embodiments will now be described in more detail with reference to FIGS. 1 through 9. It is to be appreciated that these embodiments are presented by way of illustrative example only, and should not be construed as limiting in any way.

FIG. 1 shows an example information processing system 100 that comprises an encoder-decoder network configured to implement task-aware privacy preservation for multi-dimensional data in an illustrative embodiment. The encoder-decoder network comprises an encoder 104, a signal combiner 105 and a decoder 106. Additional components of system 100 include a task function 107, and an additional instance of the task function 107, denoted as task function 107', with the latter being utilized in offline training.

In operation, an input data sample x is applied to the encoder 104 of the encoder-decoder network to generate a corresponding latent representation $\phi$. The latent representation $\phi$ is combined with a noise vector w in the signal combiner 105, and the resulting combined latent representation and noise is applied to the decoder 106 of the encoder-decoder network to generate an estimated data sample $\hat{x}$. The estimated data sample $\hat{x}$ represents a privacy-preserving data sample, and is illustratively output by the decoder 106 to another system, such as an ML system, with one or more other privacy-preserving data samples, for further processing. The ML system, not explicitly shown in the figure, may be part of the information processing system 100, or implemented in another system or device.

Outputting the estimated data sample in some embodiments therefore comprises providing the estimated data sample from the encoder-decoder network to an ML system for further processing with one or more other estimated data samples generated from one or more other input data samples. The estimated data sample illustratively provides LDP relative to the input data sample within a specified privacy budget.

Respective sets of parameters $\theta_e$ and $\theta_d$ of the encoder 104 and decoder 106 are configured based at least in part on an iterative optimization process utilizing a task loss determined from the task function 107 that relates the input data sample x to a task output y. An example of such an iterative optimization process is shown in FIG. 2, although it is to be appreciated that other iterative optimization processes can be used in other embodiments.

A given iteration of the iterative optimization process illustratively comprises applying an instance of the estimated data sample $\hat{x}$ to the task function 107 to generate an estimated task output $\hat{y}$, determining a loss measure based at least in part on the estimated task output $\hat{y}$, and adjusting at least one of the respective sets of parameters $\theta_e$ and $\theta_d$ of the encoder 104 and decoder 106 based at least in part on the loss measure.

The loss measure in this embodiment is denoted as task loss $l(\hat{y}, y)$, although other loss measures can be used in other embodiments. Determination of the loss measure is based at least in part on offline training using the instance of task function 107' that relates the input data sample x to the task output y. Accordingly, in some embodiments, the task function 107 relating the input data sample to the task output is determined in an offline training phase. The task function 107 is illustratively represented at least in part in the form of a task matrix, although other formats can be used.

In some embodiments, adjusting at least one of the respective sets of parameters of the encoder 104 and decoder 106 based at least in part on the loss measure comprises updating at least one parameter in the set of parameters $\theta_e$ of the encoder 104 utilizing a first negative gradient of the loss measure, and updating at least one parameter in the set of parameters $\theta_d$ of the decoder 106 utilizing a second negative gradient of the loss measure, with the second negative gradient of the loss measure being different than the first negative gradient of the loss measure. In some embodiments, the first negative gradient has an associated regularization term and the second negative gradient does not have an associated regularization term. Examples of these negative gradients can be seen in the example iterative optimization process of FIG. 2, although other types of gradients can be used in other embodiments.

The given iteration of the iterative optimization process in some embodiments further comprises at least one of computing a sensitivity value for the encoder 104, and selecting a noise vector for combining in signal combiner 105 with an instance of the latent representation, examples of which are also shown in FIG. 2.

In some embodiments, combining the latent representation from the encoder 104 with noise comprises combining the latent representation with a noise vector selected from a specified noise domain. For example, the noise vector may comprise a Laplacian noise vector selected from a Laplacian noise domain, although other types of noise may be used.

In some embodiments, at least one of the encoder 104, the decoder 106 and the task function 107 is illustratively implemented as a linear function, or another type of function.

Additionally or alternatively, at least one of the encoder 104, the decoder 106 and the task function 107 is implemented as a neural network. For example, the encoder-decoder network of FIG. 1 may more particularly comprise an encoder-decoder neural network, with each of the encoder 104 and the decoder 106 being implemented as a neural network, possibly with the task function 107 also being implemented as a neural network. Examples of such neural networks are described in more detail elsewhere herein.

The information processing system 100 illustratively comprises at least one processing platform that implements the encoder-decoder network and the task function, as well as one or more related systems or devices. For example, the one or more processing platforms can implement additional processing circuitry associated with one or more ML systems or other types of systems that process estimated data samples generated by the encoder-decoder network. A given such processing platform illustratively comprises at least one processing device comprising a processor coupled to a memory.

FIG. 2 shows an exemplary task-aware privacy preservation process for multi-dimensional data, illustratively implemented at least in part in the encoder-decoder network of FIG. 1, although suitable for implementation in numerous other types of devices and systems. The process in this embodiment more particularly comprises a task-aware algorithm for LDP data preservation within a specified privacy budget.

The algorithm is also denoted in the figure as Algorithm 1, and includes multiple iterations over respective ones of a plurality of epochs as shown. Algorithm 1 is an example of an iterative optimization process that adjusts the respective sets of parameters $\theta_e$ and $\theta_d$ of the encoder 104 and decoder 106 utilizing a task loss determined from the task function 107 that relates the input data sample x to a task output y. Additional details regarding the operation of Algorithm 1 of FIG. 2 are provided elsewhere herein.

It is to be understood that this particular process is only an example, and additional or alternative processes, utilizing other types and arrangements of processing operations, can be performed in an information processing system in other embodiments.

Numerous other techniques can be used in association with implementation of task-aware privacy preservation for multi-dimensional data as disclosed herein.

Accordingly, the particular processing operations and other functionality described in conjunction with Algorithm 1 of FIG. 2 are presented by way of illustrative example only, and should not be construed as limiting the scope of the invention in any way.

Alternative embodiments can use other types of processing operations involving encoder-decoder networks and other types of devices and systems. For example, the ordering of the process steps may be varied in other embodiments, or certain steps may be performed concurrently with one another rather than serially. Also, multiple instances of the process may be performed in parallel with one another within system 100 for different sets of multi-dimensional data to be anonymized for further processing.

Another illustrative embodiment of an information processing system configured to implement task-aware privacy preservation for multi-dimensional data will now be described in conjunction with FIG. 3.

FIG. 3 shows an information processing system 300 implementing task-aware privacy preservation in an illustrative embodiment. The system 300 comprises a plurality of user devices 301-1, 301-2, ... 301-N that communicate with a processing platform 302 over a network 304. The processing platform 302, which is illustratively implemented as one or more processing devices, comprises a task-aware privacy preservation system 306 that includes an encoder-decoder network 310, a task function offline training module 312, and a network parameter optimization module 314, although other types and arrangements of processing modules and additional or alternative components can be used.

The user devices 301 illustratively comprise laptop computers, tablet computers, desktop computers, mobile telephones, or other types of computers or communication devices, in any combination. Such user devices 301 are considered examples of "processing devices" as that term is broadly used herein.

The processing platform 302 illustratively comprises one or more computers, servers or other processing devices. Although shown as separate from the user devices 301 in this embodiment, the processing platform 302 can itself be another user device, or a more complex arrangement of processing devices, as in an enterprise-based or cloud-based processing platform or other type of data center.

The network 304 can comprise, for example, a global computer network such as the Internet, a wide area network (WAN), a local area network (LAN), a satellite network, a telephone or cable network, a cellular network such as a 4G or 5G network, a wireless network implemented using a wireless protocol such as Bluetooth, WiFi or WiMAX, or various portions or combinations of these and other types of communication networks.

In operation, the task-aware privacy preservation system 306 of processing platform 302 is illustratively configured to obtain input data samples, possibly from one or more of the user devices 301 and/or other data sources 303 (e.g., databases, other platforms, etc.), and to generate corresponding task-aware privacy-preserved estimated data samples utilizing encoder-decoder network 310. The encoder-decoder network 310 illustratively comprises one or more instances of the encoder-decoder network of FIG. 1, each operating as previously described. The resulting estimated data samples are provided to one or more ML systems 315 for further processing, thereby preserving user privacy in the input data samples.

The task function offline training module 312 is configured to determine a task function for a given instance of the encoder-decoder network 310, in the manner previously described.

The network parameter optimization module 314 controls the performance of an iterative optimization process, such as that provided by Algorithm 1 of FIG. 2, for each instance of the encoder-decoder network 310.

Numerous other arrangements of one or more processing devices can be used to implement task-aware privacy preservation system 306.

Although the task-aware privacy preservation system 306 is shown as being implemented on a single processing platform 302 in the present embodiment, this is by way of illustrative example only. In other embodiments, the various components 310, 312 and 314 of the task-aware privacy preservation system 306, or portions of one or more such components, can each be implemented on a separate processing platform, or using other arrangements. A given such processing platform is assumed to include at least one processing device comprising a processor coupled to a memory. Examples of such processing devices include computers, servers or other processing devices arranged to communicate over a network.

The processing platform 302 in the present embodiment further comprises a processor 320, a memory 322 and a network interface 324. The processor 320 is assumed to be operatively coupled to the memory 322 and to the network interface 324 as illustrated by the interconnections shown in the figure.

The processor 320 may comprise, for example, a microprocessor, an application-specific integrated circuit (ASIC), a field-programmable gate array (FPGA), a central processing unit (CPU), a tensor processing unit (TPU), a graphics processing unit (GPU), an arithmetic logic unit (ALU), a digital signal processor (DSP), or other similar processing device component, as well as other types and arrangements of processing circuitry, in any combination. At least a portion of the functionality of a task-aware privacy preservation system and its associated modules, networks and/or other components provided by one or more processing devices as disclosed herein can be implemented using such circuitry.

In some embodiments, the processor 320 comprises one or more graphics processor integrated circuits. Such graphics processor integrated circuits are illustratively implemented in the form of one or more GPUs. Accordingly, in some embodiments, system 300 is configured to include a GPU-based processing platform. Such a GPU-based processing platform can be cloud-based configured to implement neural networks or other portions of one or more task-aware privacy preservation systems as disclosed herein. Other embodiments can be implemented using similar arrangements of one or more TPUs.

Numerous other arrangements are possible. For example, in some embodiments, a task-aware privacy preservation system and any associated neural networks can be implemented on a single processor-based device, such as a smartphone, client computer or other user device, utilizing one or more processors of that device. Such embodiments are examples of user device based implementations of a task-aware privacy preservation system. In other embodiments, different portions of the task-aware privacy preservation system can be distributed across multiple processing devices. For example, an encoder of an encoder-decoder network can be implemented on each of a plurality of user devices, with the corresponding decoder being implemented on another processing device, such as a cloud-based processing device that communicates with the user devices over one or more networks.

The memory 322 stores software program code for execution by the processor 320 in implementing portions of the functionality of the processing platform 302. For example, at least portions of the functionality of the encoder-decoder network 310, the task function offline training module 312 and/or the network parameter optimization module 314 can be implemented using program code stored in memory 322.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, illustrative embodiments may be implemented in the form of integrated circuits comprising processing circuitry configured to implement processing operations associated with the task-aware privacy preservation system 306 as well as other related functionality. For example, at least portions of the task-aware privacy preservation system 306, such as one or more neural networks thereof, can be illustratively implemented in at least one neural network integrated circuit of a processing device of the processing platform 302.

The network interface 324 is configured to allow the processing platform 302 to communicate over one or more networks with other system elements, and may comprise one or more conventional transceivers.

It is to be appreciated that the particular arrangement of components and other system elements shown in FIG. 3 is presented by way of illustrative example only, and numerous alternative embodiments are possible. For example, other embodiments of information processing systems can be configured to implement task-aware privacy preservation functionality of the type disclosed herein.

In some alternative embodiments of the system 300 of FIG. 3, the encoder of the encoder-decoder network 310 is implemented at least in part on a first processing device, and the decoder of the encoder-decoder network 310 is implemented at least in part on a second processing device that communicates with the first processing device over at least one network. For example, in some embodiments, the encoder can be implemented at least in part on or otherwise in association with one or more of the user devices 301, while the decoder is implemented at least in part on one or more cloud-based processing devices.

Additionally or alternatively, at least portions of the task function offline training module 312 and network parameters optimization module 314 can be implemented on separate processing devices relative to one or more components of the encoder-decoder network 310.

Numerous other distributions of system components, such as encoder, decoder and task function components and their associated training and parameter optimization modules, across multiple processing devices can be used in other embodiments.

Additional details regarding the illustrative embodiments of FIGS. 1 through 9 will now be described.

Let $x \in \mathbb{R}^n$ be an individual data sample, and X be the domain of x, which is assumed to be a compact subset of $\mathbb{R}^n$. A randomized algorithm $\mathcal{M}: X \mapsto \mathbb{R}^Z$ is said to satisfy $\epsilon$-LDP with privacy budget $\epsilon > 0$, if $\forall x, x' \in X$, $\mathcal{S} \subseteq \text{im } \mathcal{M}$:

$$Pr[\mathcal{M}_{(x)} \in \mathcal{S}] \leq e^\epsilon Pr[\mathcal{M}_{(x')} \in \mathcal{S}]. \quad (1)$$

Essentially, when $\epsilon$ is small, one cannot readily differentiate whether the input of $\mathcal{M}$ is an individual user data sample x or x' based on $\mathcal{M}$'s outcome.

Some embodiments disclosed herein utilize a Laplace mechanism, as will now be described.

To release a sensitive function $g: X \mapsto \mathbb{R}^Z$ under $\epsilon$-LDP, $\forall \epsilon > 0$, the Laplace mechanism adds Laplace noise to function g:

$$\mathcal{M}_{Lap}(x, g, \epsilon) = g(x) + \text{Lap}^Z\left(\mu = 0, b = \frac{\Delta_1 g}{\epsilon}\right) \quad (2)$$

where $\text{Lap}^Z(\mu, b)$ is a Z-dimensional vector whose elements are independent, identically-distributed ("iid") Laplace random variables with mean $\mu$, scale b and variance $2b^2$, and $\Delta_1 g = \max_{x,x' \in X} \|g(x) - g(x')\|_1$ measures the sensitivity of g under the $l_1$ norm.

Although some embodiments disclosed herein utilize the above-described Laplace mechanism, it is to be appreciated that other embodiments can utilize additional or alternative noise-adding mechanisms.

Figure 4:
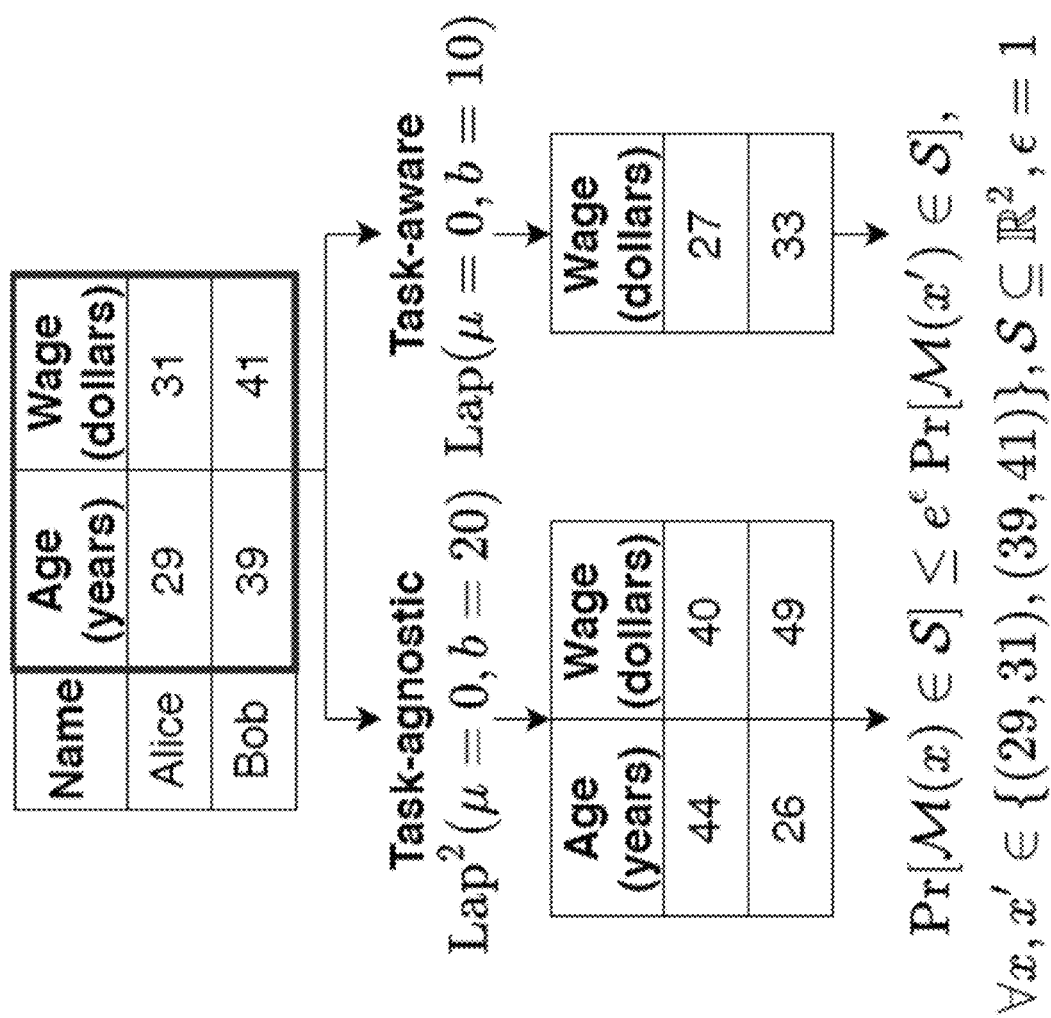
FIG. 4 shows a simplified example comparing a task-aware approach to a task-agnostic approach for a mean wage estimation task in an illustrative embodiment.

FIG. 4 shows a simplified example comparing a task-aware approach to a task-agnostic approach for a mean wage estimation task in an illustrative embodiment. In this example, as will be described in more detail below, the task-aware approach illustrated on the right side of the figure is more effective than the task-agnostic approach illustrated on the left side of the figure in terms of the mean wage estimation task, since the former perturbs the wage attribute with a smaller noise while guaranteeing the same LDP budget $\epsilon$.

For simplicity, this example considers only two users, Alice and Bob, and two data attributes, age and wage. Assume that it is necessary to preserve $\epsilon$-LDP for each user with budget $\epsilon = 1$ and the task is to estimate the mean wage as accurate as possible. A straightforward task-agnostic approach will directly expose both of the two data attributes, and add Laplace noise with scale b=20 to each attribute. However, a task-aware approach will expose only the wage attribute and add Laplace noise with scale b=10. Both of these approaches guarantee LDP under the same budget ($\epsilon = 1$), but the wage attribute given by the task-aware approach is less noisy, and the corresponding estimated mean wage (i.e., the ultimate task objective) will be close to the real value with a higher probability.

In more complex scenarios, such as when each data attribute is not redundant but is valued differently in terms of the considered task or data attributes are dependent but not perfectly correlated, the optimal solution will not be as straightforward as the given example, as will be described in more detail elsewhere herein.

Additional details relating to problem formulation in illustrative embodiments will now be described with reference again to FIG. 1.

Let $y=f(x)\in \mathbb{R}^m$ denote the task output associated with each ground truth data sample x, where $f$ represents the task function. To guarantee $\epsilon$-LDP for each data sample x, its true value should never be exposed to the task function. Instead, an estimate of x, denoted by $\hat{x}$, is used as the input to the task function with the corresponding task output $\hat{y}=f(\hat{x})$. The objective is to minimize the overall task loss $\mathcal{L}=\mathbb{E}[l(\hat{y}, y)]$ due to the difference between $\hat{x}$ and x, where x follows distribution $\mathcal{D}_x$, and l is a task loss function that captures the discrepancy between task output $\hat{y}$ and y, such as $l_2$ loss and/or cross-entropy loss. It should be noted that illustrative embodiments do not specifically deal with privacy preservation during the offline training process, and the ground truth x is used to calculate y and $\mathcal{L}$. However, LDP of user data is guaranteed after a trained model is deployed online.

As illustrated in FIG. 1, x is first mapped to a latent representation $\phi \in \mathbb{R}^Z$ through an encoder function $\phi=g_e(x; \theta_e)$ of encoder 104, where $\theta_e$ is a set of encoder parameters. The encoder function $\phi$ is then perturbed in signal combiner 105 by a Laplace noise vector $w \in \mathbb{R}^Z$. That is, $g_e$ is treated as the sensitive function g in Equation (2). Next, $\hat{x}$ is reconstructed from $\phi+w$ using a decoder function $\hat{x}=g_d(\phi+w; \theta_d)$ of decoder 106, where $\theta_d$ is a set of decoder parameters. In some embodiments, the encoder may be deployed in association with each individual user device and may be implemented in a lightweight configuration (e.g., linear or one-hidden-layer neural network).

The optimal task-aware $\hat{x}$ minimizes $\mathcal{L}$ while preserving $\epsilon$-LDP. In other words, the task-aware privacy preservation problem aims to co-design the encoder 104 and the decoder 106, by finding proper values for Z, $\theta_e$ and $\theta_d$, such that $\mathcal{L}$ is minimized and $\epsilon$-LDP is preserved. This is illustratively expressed as follows:

$$\min_{Z, \theta_e, \theta_d} \mathcal{L} = \mathbb{E}_{x,w}[l(\hat{y}, y)] \quad (3)$$

$$\text{s.t. } y = f(x), \quad (4)$$

$$\hat{y} = f(g_d(g_e(x; \theta_e) + w; \theta_d)), \quad (5)$$

$$x \sim \mathcal{D}_x, w \sim \text{Lap}^Z\left(0, \frac{\Delta_1 g_e}{\epsilon}\right). \quad (6)$$

A potential difficulty of this example task-aware LDP problem in illustrative embodiments relates to the discrepancy of the measurement of overall task loss $\mathcal{L}$, which depends on $\mathcal{D}_x$ and captures the average performance, and the mechanism of preserving LDP, which depends on X and focuses only on the worst-case privacy guarantee.

Example benchmarks that are used herein to demonstrate advantages of example task-aware approaches will now be described. Both benchmarks preserve $\epsilon$-LDP.

The first benchmark is a task-agnostic approach that adds noise directly to the normalized x, where the normalization can be implemented by, for example, normalizing each dimension independently when x is a multi-variate random variable, or normalizing all the dimensions jointly when x is a univariate time-series. For simplicity, it is assumed that x is already normalized, and accordingly Z=n and $g_e(x)=x$.

The second benchmark is a privacy-agnostic approach that adds noise to $\phi$ obtained by considering the problem defined in Equations (3)-(6) with a pre-determined Z≤n and w being a zero vector instead. That is, the privacy-preservation part is neglected when designing the encoder, and hence a proper Z needs to be pre-determined or one would always conclude that a larger Z, under which more information can be delivered when noise is absent, is better.

Both of these benchmark approaches still need to determine the optimal decoder parameters $\theta_d$ for input $\phi+w$. For the task-agnostic approach, even though $g_e$ is an identity function, the corresponding optimal $g_d$ is usually not an identity function.

The manner in which the above example task-aware privacy preservation problem is solved in illustrative embodiments will now be described. Initially assuming a linear model and MSE task loss, near-optimal analytical results are obtained, which provide insight on how to co-design an encoder and decoder in illustrative embodiments. This is extended to general settings and the gradient-based learning algorithm of FIG. 2 is further described, demonstrating strong empirical performance.

In initially considering the linear model with MSE task loss, encoder function $g_e$, decoder function $g_d$, and task function $f$ are assumed to be linear functions in their corresponding inputs, and the loss function is $l=\|\hat{y}-y\|_2^2$. The task function $f$ can then be expressed as $f(x)=Kx$, where $K \in \mathbb{R}^{m \times n}$ is the task matrix.

Linear transformation is a common encoding and decoding approach for many dimensionality-reduction techniques, such as PCA, and $\ell_2$ task loss is widely used in many application scenarios. For example, given N samples of x, assume that the task is to estimate the mean value of these samples in a few directions, given by task matrix K. Then the sum of the variance of these estimates by using $\hat{x}$ instead of x will be $$\frac{1}{N}\mathbb{E}_{x,w}\left[\|K(\hat{x}-x)\|_2^2\right],$$

so $\mathcal{L}=\mathbb{E}_{x,w}[\|K(\hat{x}-x)\|_2^2]=\mathbb{E}_{x,w}[\|\hat{y}-y\|_2^2]$ is a natural objective function.

For the task-aware approach, an optimal decoder is first determined, and then the optimal encoder and the corresponding optimal loss is formulated under an illustrative assumption of a boundary being a centered hypersphere. This assumption is then relaxed, and upper and lower bounds for the optimal loss and an approximate solution are determined.

In the following, without loss of generality, it is assumed that the covariance matrix of $x-\mu_x$, i.e., $\mathbb{E}[(x-\mu_x)(x-\mu_x)^T]$, where T denotes the transpose operator, is a positive definite matrix, where $\mu_x \in \mathbb{R}^n$ is the mean vector of x. This assumption guarantees that x cannot be linearly transformed to a low-dimensional representation without losing information.

Then, $\mathbb{E}[(x-\mu_x)(x-\mu_x)^T]$ is factorized into $LL^T$ through Cholesky decomposition, where $L \in \mathbb{R}^{n \times n}$ is a lower triangular matrix with positive diagonal entries. For analytical convenience, it is assumed that $h=L^{-1}(x-\mu_x)$ which can be viewed as another representation of x, with mean $\mu_h=0$ and covariance matrix $\Sigma_{hh}=I$. Let $\mathcal{D}_h$ denote the distribution of h, and $\mathcal{H}=\{L^{-1}(x-\mu_x)|x \in X\}$ denote the compact set that contains all the possible values of $h \sim \mathcal{D}_h$. Since $K(\hat{x}-x)=P$ ($\hat{h}$–h), where P=KL, working with data representation h with task matrix P is equivalent to using x and K. Considering zero-centered h instead of original x avoids considering the constant terms in the linear encoder and decoder functions. In particular, the $l_1$-sensitivity of a linear encoder function doesn't change when the constant term is zero, i.e., $\Delta_1 g_e = \Delta_1 (g_e+c)$, $\forall c \in \mathbb{R}^Z$.

Let $E \in \mathbb{R}^{Z \times n}$ and $D \in \mathbb{R}^{n \times Z}$ denote the encoder and decoder matrix associated with h, i.e., $\phi=Eh$ and $\hat{h}=D(Eh+w)$. Without loss of generality, illustrative embodiments let $Z \geq n$ and allow some rows of E to be zero. Equivalently, based on the relationship between x and h, $\phi=EL^{-1}(x-\mu_x)$ and $\hat{x}-\mu_x=LD(EL^{-1}(x-\mu_x)+w)$. The covariance matrix of w is denoted by $\Sigma_{ww}$, and it can be expressed as $\Sigma_{ww}=\sigma_w^2 I$, where $\sigma_w^2$ is the variance of the noise added to each dimension of $\phi$.

An optimal decoder D that minimizes $\mathcal{L}$ for a given encoder E and $\sigma_w^2$ can be expressed as $D=E^T(EE^T+\sigma_w^2 I)^{-1}$, and the corresponding $\mathcal{L}$ is:

$$\mathcal{L} = Tr(P^T P) - Tr(P^T P E^T (EE^T + \sigma_w^2 I)^{-1} E) \quad (7)$$

where Tr(•) denotes the trace of a matrix.

It should be noted in this regard that the optimal decoder D is not the Moore-Penrose inverse of encoder E. In matrix factorization, the decoder matrix is however constrained to be the Moore-Penrose inverse of the encoder matrix.

The next step is to find an encoder E that minimizes Equation (7). Since $\Delta_1 g_e = \max_{v,v' \in E(\mathcal{H})} \|v-v'\|_1$, where $E(\mathcal{H})=\{Eh|h \in \mathcal{H}\}$ is the image of $\mathcal{H}$ under linear transformation E, the design of encoder E will affect $\Delta_1 g_e$ and therefore $\sigma_w^2$, and for different $\mathcal{H}$'s the effect of E is also different in general. The relationship between E and $\mathcal{H}$ is therefore carefully considered through geometric analysis. It should be noted that when using an upper bound of the sensitivity, such geometric analysis is not needed. However, in illustrative embodiments, the exact value of $\Delta_1 g_e$ is considered.

When computing $\Delta_1 g_e$ one can use $\mathcal{H}$'s convex hull $\mathcal{S}$ instead of $\mathcal{H}$ itself, as the convex hull preserves $\Delta_1 g_e$:

$$\Delta_1 g_e = \max_{v,v' \in E(\mathcal{S})} \|v-v'\|_1. \quad (8)$$

For encoder E, its singular value decomposition (SVD) is considered instead, and is given by $U \Sigma V^T$, where $U \in \mathbb{R}^{Z \times Z}$ and $V \in \mathbb{R}^{n \times n}$ orthogonal matrices and $\Sigma \in \mathbb{R}^{Z \times Z}$ is a rectangular diagonal matrix, and the singular values are denoted by $\sigma_1, \ldots, \sigma_n$ with $|\sigma_1| \geq \ldots \geq |\sigma_n|$. Then designing E is equivalent to designing matrices U, V and $\Sigma$. The geometric interpretation of applying transform $E=U \Sigma V^T$ to set $\mathcal{S}$ includes the following three sub-transforms: (1) rotate $\mathcal{S}$ by applying rotation matrix $V^T$; (2) scale $V^T(\mathcal{S})$ by applying scaling matrix $\Sigma$; and (3) rotate $EV^T(\mathcal{S})$ by applying rotation matrix U. In general, the choice of any of U, $\Sigma$, and V will affect $\Delta_1 g_e$ and hence $\sigma_w^2$.

Illustrative embodiments first minimize the loss L and the sensitivity value $\Delta_1 g_e$ over U and V. Under the assumption that the boundary is a centered hypersphere, the resulting U and V only depend on $\Sigma$, as will be described in more detail below. One can then determine the optimal $\Sigma$ that minimizes the $\mathcal{L}$ given privacy budget $\epsilon$, also as described below. As indicated previously, this assumption is later relaxed.

Two points within a compact set must lay on the boundary to have the maximum $\ell_1$ distance. In order to decouple the relationship between the choice of V and the value of $\Delta_1 g_e$, the above-noted assumption is made in terms of boundary $\partial \mathcal{S}$ of $\mathcal{S}$. More particularly, it is assumed that the boundary $\partial \mathcal{S}$ is a centered hypersphere of radius $r \geq 0$, which is expressed as $\{h \in \mathbb{R}^n | \|h\|_2^2 = r^2\}$.

This is a strong assumption, but in further description below the assumption will be relaxed and lower and upper bounds of $\mathcal{L}$ are given for any possible $\partial \mathcal{S}$ based on the results obtained under the assumption. Since $\partial V(\mathcal{S}) = \{h \in \mathbb{R}^n | \|h\|_2^2 = r^2\} = \partial \mathcal{S}$ for any orthogonal V, this assumption provides the beneficial property that the choice of V doesn't affect $\Delta_1 g_e$ and $\sigma_w^2$. Based on the assumption, one can safely consider the optimal design of V that minimizes $\mathcal{L}$ when $\Sigma$ and $\sigma_w^2$ are given, which leads to the following, an optimal rotation matrix V that minimizes $\mathcal{L}$ under the assumption.

Suppose that the eigen-decomposition of the Gram matrix $P^T P$ is expressed as $P^T P Q = Q \Lambda$, where $\Lambda = \text{diag}(\lambda_1, \ldots, \lambda_n) \in \mathbb{R}^{n \times n}$ is a diagonal matrix whose diagonal elements are eigenvalues with $\lambda_1 \geq \ldots \geq \lambda_n \geq 0$, and $Q \in \mathbb{R}^{n \times n}$ is an orthogonal matrix whose columns are corresponding normalized eigenvectors. Then, when $\Sigma$ and $\sigma_w^2$ are given, $\mathcal{L}$ is minimized for V=Q, any $Z \geq n$, and any orthogonal U, and the corresponding $\mathcal{L}$ can be expressed as:

$$\mathcal{L} = \sum_{i=1}^n \lambda_i - \sum_{i=1}^n \lambda_i \frac{\sigma_i^2}{\sigma_i^2 + \sigma_w^2}. \quad (9)$$

It is clear that choosing a Z>n brings no additional benefit. Accordingly, Z=n is considered here for simplicity.

After the first two sub-transforms $\Sigma$ and $V^T$, the boundary $\partial \mathcal{S} = \{h \in \mathbb{R}^n | \|h\|_2^2 = r^2\}$ becomes $\partial \Sigma V^T(\mathcal{S}) = \{v \in \mathbb{R}^n | \Sigma_{i=0}^n v_i^2 / \sigma_i^2 = r^2\}$, which is a hyperellipsoid. This leads to the following, which gives the optimal rotation matrix U which minimizes $\Delta_1 g_e$ under the assumption that the boundary is a centered hypersphere.

More particularly, for a given $\Sigma$, U=I minimizes $\Delta_1 g_e$, and the corresponding minimum value is:

$$\Delta_1 g_e = 2r \sqrt{\sum_{i=1}^n \sigma_i^2}. \quad (10)$$

Next, the scaling matrix $\Sigma$, or equivalently, the values of $\sigma_1^2, \ldots, \sigma_n^2$, are determined to minimize Equation (9). Clearly, for any given $\sigma_1^2, \ldots, \sigma_n^2$, if increased proportionally, then $\sigma_w^2$ also needs to be increased proportionally to preserve the same $\epsilon$-LDP. So without loss of generality, an additional constraint $\Sigma_{i=1}^n \sigma_i^2 = M$ is imposed, where M is a positive constant. The following will give the optimal choice of scaling matrix $\Sigma$ that minimizes $\mathcal{L}$ and preserves $\epsilon$-LDP with the Laplace mechanism, still under the original assumption of the boundary being a centered hypersphere.

The optimal choice of $\sigma_1^2, \ldots, \sigma_n^2$ that minimizes $\mathcal{L}$ and preserves $\epsilon$-LDP with the Laplace mechanism under the additional constraint of $\Sigma_{i=1}^n \sigma_i^2 = M$ is given by:

$$\sigma_i^2 = \begin{cases} M \cdot \left( \frac{\sqrt{\lambda_i}}{\sum_{i=1}^{Z'} \sqrt{\lambda_i}} \left(1 + Z' \cdot \frac{8r^2}{\epsilon^2}\right) - \frac{8r^2}{\epsilon^2} \right), & \forall i \leq Z' \\ 0, & \text{otherwise} \end{cases} \quad (11)$$

where $Z' \leq n$ the largest integer such that:

$$\frac{\sqrt{\lambda_{Z'}}}{\sum_{i=1}^{Z'} \sqrt{\lambda_i}} \left(1 + Z' \cdot \frac{8r^2}{\epsilon^2}\right) - \frac{8r^2}{\epsilon^2} > 0 \quad (12)$$

and the corresponding $\mathcal{L}$ is:

$$L = \frac{8r^2/\epsilon^2}{1 + Z' \cdot 8r^2/\epsilon^2} \left(\sum_{i=1}^{Z'} \sqrt{\lambda_i}\right)^2 + \sum_{i=Z'+1}^{n} \lambda_i. \quad (13)$$

For the task-aware approach, the above description provides an optimal encoder and decoder design that preserves ϵ-LDP with the Laplace mechanism under the assumption that the boundary is a centered hypersphere.

Figure 5:
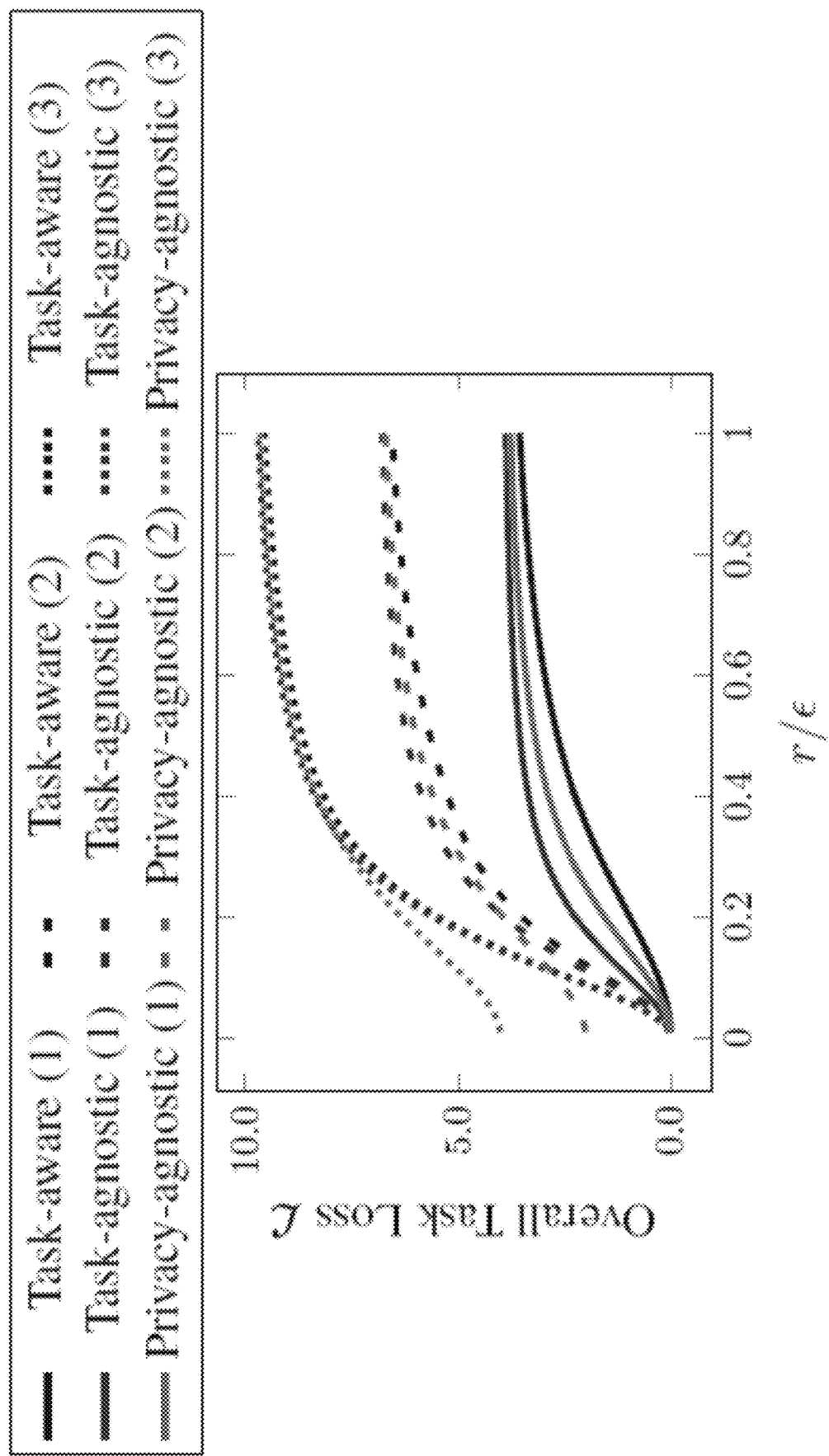
FIG. 5 shows plots of task loss as a function of privacy budget for task-aware, task-agnostic and privacy-agnostic approaches in illustrative embodiments.

FIG. 5 compares the theoretical overall task loss $\mathcal{L}$ comparison when L=I and the assumption of the boundary being a centered hypersphere holds, for respective task-aware, task-agnostic and privacy-agnostic approaches. The derivations of the benchmark task-agnostic and privacy-agnostic approaches are described elsewhere herein. Three different settings (1), (2) and (3) are considered in the comparisons illustrated in FIG. 5, with the settings having n=4 and $\lambda_1=4$ in common, but with settings (1), (2) and (3) having $\lambda_2=\lambda_3=\lambda_4$ as 0, 1 or 2, respectively. Accordingly, in settings (1), (2) and (3), $\lambda_{2:4}=0$, $\lambda_{2:4}=1$, $\lambda_{2:4}=2$, respectively. For the privacy-agnostic approach, a pre-determined Z=2 is used, although it is to be appreciated in these and other embodiments that alternative values of Z can be used, under which the result may be slightly different but the task-aware approach will still outperform.

It can be seen from the plots in FIG. 5 that, compared to the task-agnostic approach, the task-aware approach achieves the largest improvement in setting (1), because $\lambda_{2:4}=0$ implies that $x_{2:4}$ are purely redundant. One can expect even higher gain than setting (1) when using larger n and zero $\lambda_{2:n}$ values, and the gain will be zero if all the $\lambda_i$ values are equal. Also, the privacy-agnostic approach completely missed the information carried by $x_{3:4}$, which explains the improvement of the task-aware approach for small r/ϵ in settings (2) and (3). One can expect higher gain than setting (3) when using larger n and larger $\lambda_{2:n}$ values, and the gain will be zero if all the missed $x_i$ values correspond to zero $\lambda_i$ values and all the other $\lambda_i$ values are equal.

Based on the above-described results under the boundary assumption, the following description provides a transition to a general boundary ∂S, and more particularly provides lower and upper bounds of optimal $\mathcal{L}^*$ for general boundary ∂S, which is not necessarily a centered hypersphere, when ϵ-LDP is preserved with Laplace mechanism.

As disclosed herein, it can be shown that, assuming ∂S ⊂ {h∈ $\mathbb{R}^n$: $r_{min}^2 \leq \|h\|_2^2 \leq r_{max}^2$}. Then when ϵ-LDP is preserved with the Laplace mechanism, the optimal $\mathcal{L}^*$ is bounded by:

$$\mathcal{L}(r_{min}; \lambda_{1:n}, \epsilon) \leq \mathcal{L}^* \leq \mathcal{L}(r_{max}; \lambda_{1:n}, \epsilon) \quad (14)$$

where $\mathcal{L}(r; \lambda_{1:n}, \epsilon)$ is the value of $\mathcal{L}$ as determined using Equations (12) and (13) for given radius r, eigenvalues $\lambda_{1:n}$ and privacy budget ϵ.

Therefore, to preserve ϵ-LDP with the Laplace mechanism, the task-aware solution for general ∂S includes the following steps:

1. Find the smallest $r_{max}$ and the largest $r_{min}$ that bound ∂S.
2. Assume ∂S is {h∈ $\mathbb{R}^n$:$\|h\|_2^2 = r_{max}^2$}, and choose encoder E and decoder D in the manner described previously. The corresponding $\sigma_w^2$ is not used, however, because it may guarantee a higher LDP than needed.
3. Compute $\sigma_w^2$ for real ∂S under decoder D privacy budget ϵ.

The associated loss for the task-aware approach is at most $\mathcal{L}(r_{max}; \lambda_{1:n}, \epsilon)$. Though in general not optimal, it differs from $\mathcal{L}^*$ by at most $\mathcal{L}(r_{max}; \lambda_{1:n}, \epsilon) - \mathcal{L}(r_{min}; \lambda_{1:n}, \epsilon)$. The difference is small when ∂S approximates a hypersphere, i.e., when $r_{max} - r_{min} \approx 0$.

For more complex scenarios, it is challenging to give an analytical solution to the task-aware privacy preservation problem, especially when the encoder function $g_e$, decoder function $g_d$, and task function $f$ correspond to neural networks. Accordingly, illustrative embodiments herein provide a gradient-based learning algorithm, such as the example Algorithm 1 of FIG. 2, which will be described in more detail below. Again, benchmark algorithms for respective task-agnostic and privacy-agnostic approaches are described elsewhere herein.

As indicated previously, Algorithm 1 of FIG. 2 provides an example task-aware algorithm for general settings. The privacy budget ϵ and the latent dimension Z are used as inputs for the algorithm. In general, Z should be proper, in other words, it is neither too small (such that a better solution could be found by choosing a larger Z) nor too big (which introduces unnecessary complexity). In practice, one can determine a proper Z on a case-by-case basis, as described in more detail elsewhere herein.

Next, the algorithm adopts an alternating iteration approach, where in each epoch, the algorithm first updates parameters $\theta_e$, $\theta_d$ by their corresponding negative gradients in line 3, and then recomputes $\Delta_1 g_e$ and re-samples w from $Lap^Z(0, \Delta_1 g_e/\epsilon)$ in line 4. Note that, in terms of encoder parameter $\theta_e$, instead of considering the gradient of $\mathcal{L}$, the algorithm adds an $\ell_2$ regularization term $\eta \|\theta_e\|_F^2$ where η is a positive constant. Therefore, the algorithm updates $\theta_e$ with the negative gradient $-(\nabla_{\theta_e} \mathcal{L} + 2\eta \theta_e)$. Without such regularization, $\|\theta_e\|_F^2$ will grow to infinity since one can always achieve a smaller $\mathcal{L}$ by increasing the scale of φ proportionally. But such a scale increase is typically not desirable, since $\sigma_w^2$ will also increase proportionally to guarantee ϵ-LDP. Moreover, the time complexity of computing $\Delta_1 g_e$ is quadratic in the number of data samples, and when necessary one can split the samples into mini-batches or use parallel processing to reduce the computational time.

Additional aspects of example task-agnostic and privacy-agnostic approaches will now be described, for comparison with the above-described example task-aware approach.

The optimal task loss $\mathcal{L}$ for the task-agnostic approach can be obtained by letting E=L and using Equation (7) above. The associated decoder is given by $D = L^T(LL^T + \sigma_w^2 I)^{-1}$ and as noted above is not an identity matrix in general. The optimal $\mathcal{L}$ for the task-agnostic approach that preserves ϵ-LDP is given by:

$$\mathcal{L} = Tr(P^T P) - Tr(P^T P L^T (LL^T + \sigma_w^2 I)^{-1} L) \quad (15)$$

where $\sigma_w^2 = 2(\Delta_1 g_e)^2/\epsilon^2$ with $g_e(x) = x$.

The optimal task loss $\mathcal{L}$ for the privacy-agnostic approach, which has a pre-determined Z≤n, can also be obtained. More particularly, the optimal $\mathcal{L}$ for the privacy-agnostic approach that preserves ϵ-LDP is given by:

$$\mathcal{L} = \sum_{i=1}^{Z} \lambda_i \frac{\sigma_w^2}{\sigma_i^2 + \sigma_w^2} + \sum_{i=Z+1}^{n} \lambda_i \quad (16)$$

where $\sigma_w^2 = 2(\Delta_1 g_e)^2/\epsilon^2$.

When L=I and the previously-described assumption of the boundary being a centered hypersphere holds, for the task-agnostic approach, in accordance with Equation (15), the optimal task loss $\mathcal{L}$ is given by:

$$\mathcal{L} = \frac{\sigma_w^2}{1+\sigma_w^2} \cdot Tr(P^T P) = \frac{n \cdot 8r^2/\epsilon^2}{1+n \cdot 8r^2/\epsilon^2} \sum_{i=1}^{n} \lambda_i. \quad (17)$$

For the privacy-agnostic approach, in accordance with Equations (10) and (16), and assuming equal $\sigma_i$ values and minimum $\Delta_1 h_e$, the optimal task loss $\mathcal{L}$ is given by:

$$\mathcal{L} = \frac{Z \cdot 8r^2/\epsilon^2}{1+Z \cdot 8r^2/\epsilon^2} \sum_{i=1}^{Z} \lambda_i + \sum_{i=Z+1}^{n} \lambda_i \quad (18)$$

where the value of Z is pre-determined.

In the benchmark approaches under general settings, for the privacy-agnostic approach, the encoder and decoder are first trained without considering privacy preservation by updating the encoder parameters $\theta_e$ and the decoder parameters $\theta_d$ with $-\nabla\theta_e \mathcal{L}$ and $-\nabla\theta_d \mathcal{L}$, respectively. Next, the encoder parameters $\theta_e$ are fixed and the decoder is trained with input $\phi+w$, which represents a modification of lines 3-4 of Algorithm 1 in FIG. 2. The task-agnostic approach trains the decoder in the same way, but fixes $g_e$ to an identity mapping function.

Illustrative embodiments were evaluated to compare the performance of corresponding example task-aware approaches as disclosed herein with the above-described benchmark approaches. Three applications and corresponding datasets from the standard UCI Machine Learning Repository are considered, namely, mean estimation of hourly household power consumption, real estate valuation, and breast cancer detection. Moreover, to show the generality of the task-aware approach with respect to high-dimensional image datasets, additional experimental results for a Modified National Institute of Standards and Technology (MNIST) dataset are also described.

The evaluation was performed on a processing platform comprising a laptop computer with 2.7 GHz Intel Core I5 processor and 8-GB 1867 MHz DDR3 memory. The code was implemented in Pytorch. An Adam optimizer and a learning rate $10^{-3}$ was used for all of the applications. The number of samples, train/test split, training epochs, and resulting runtime are summarized in Table 1 below.

TABLE 1

| | | Evaluation Details | | |
|---|---|---|---|---|
| Application | Number of Samples | Train/Test Split | Training Epochs | Runtime |
| Household Power | 1417 | 0.7/0.3 | N/A | <1 min |
| Real Estate | 414 | 0.7/0.3 | 2000 | <2 hrs |
| Breast Cancer | 569 | 0.7/0.3 | 2000 | <2 hrs |

It should be noted that the evaluation for hourly household power consumption is based on the theoretical solutions, so training epochs, which are associated with the gradient-based method, are not applicable there. All three datasets cited in the evaluation are publicly available from the standard UCI Machine Learning Repository and anonymized using standard practices.

For task function $f$, the evaluations use a one-hidden-layer feedforward neural network with input size n, hidden size 1.5 n and output size 1 in both the real estate valuation and breast cancer detection experiments. The activation function used by the hidden layer and output layer is a Rectified Linear Unit (ReLU), although other types of activation functions can additionally or alternatively be used in other embodiments.

In these experiments, it was found that this illustrative network architecture yields near-zero loss with ground truth x and y, and in order to avoid overfitting a deep neural network was not used. For example, some embodiments did not see any task improvement using a two-layer network. It is to be appreciated, however, that other embodiments can be implemented using neural networks of different types and different numbers and configurations of layers, including deep neural networks.

For the encoder/decoder, a linear model implemented as a one-layer neural network with input and output size n was used in the real estate valuation experiment. For this experiment, the linear model was found to be sufficient to provide good performance. A one-hidden-layer feedforward neural network with input size n, hidden size n and output size n was used for the encoder/decoder in the breast cancer detection experiment. The activation functions used by the hidden layer and output layer are a logistic function and an identity function, respectively. For the gradient-based learning algorithm described previously, values of $\eta=0.2$ and $\eta=0.001$ were used in the real estate valuation and breast cancer detection experiments, respectively, and in both of these experiments, for each epoch $\theta_e$ and $\theta_d$ were updated by 15 steps.

It should be noted that, in some embodiments, a suitable value for Z may be determined on a case-by-case basis for the task-aware approach.

Mean Estimation of Hourly Household Power Consumption

The mean estimation problem in this application was based on measurements of individual household electric power consumption over four years. Each data sample $x \in \mathbb{R}^{24}$ is a time-series that contains the hourly household power consumption for one single day, and the objective is to estimate the mean of the hourly household power consumption for N days. As indicated previously, the overall task loss can be defined as follows:

$$\mathcal{L} = \mathbb{E}_{x \sim \mathcal{D}_x}\left[\|K(\hat{x}-x)\|_2^2\right] = \sum_{i=1}^{24} k_i^2 \mathbb{E}_{x \sim \mathcal{D}_x}\left[(\hat{x}_i - x_i)^2\right] \quad (19)$$

where K32 diag $(k_1, k_2, \ldots, k_{24})$ factors the importance of the mean estimation for each hour. This experiment sets $k_i=2$ for $i \in \{9, 10, \ldots, 20\}$ (i.e., day-time hours) and $k_i=1$ for other values of i (i.e., night-time hours), and adopts a linear encoder and decoder model. As this particular problem is based on a linear model with MSE task loss, the corresponding solutions described previously for the three approaches are adopted, and Z=3 is chosen for the privacy-agnostic approach.

Figure 6:
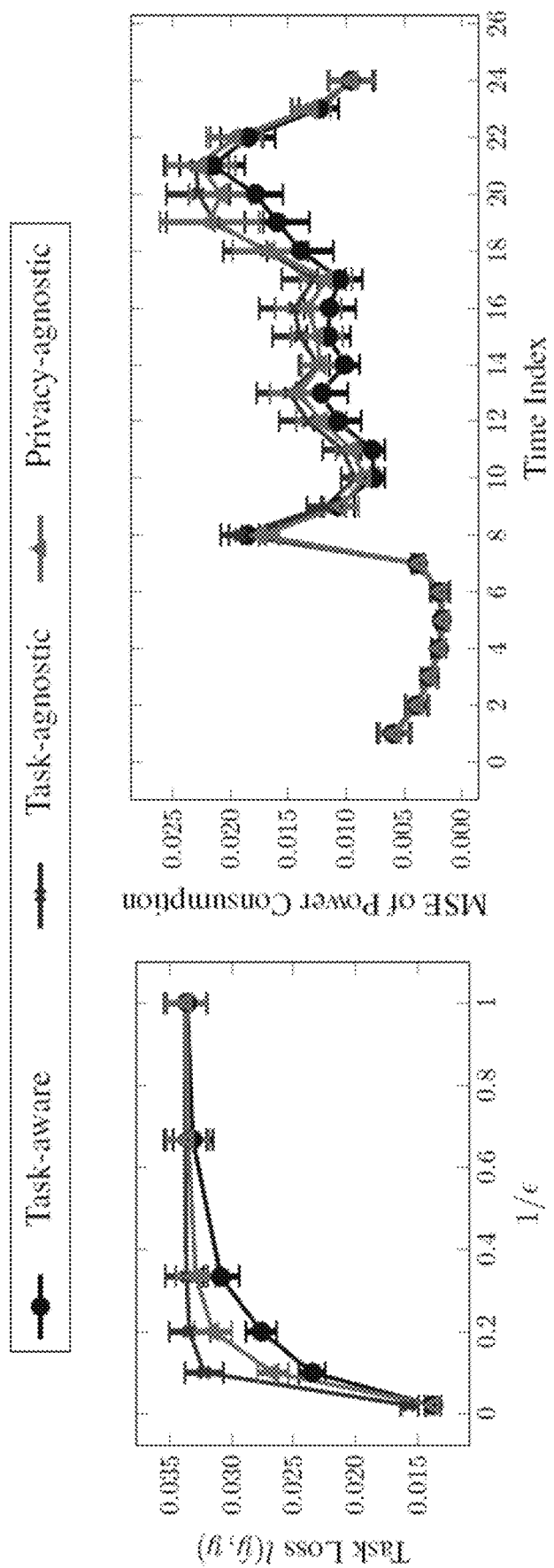
FIG. 6 shows plots of experimental results comparing task-aware, task-agnostic and privacy-agnostic approaches in an example application involving determination of hourly household power consumption.

FIG. 6 shows the results for the hourly household power consumption experiments. The left side of the figure shows the task loss $l(\hat{y}, y)$ for the task-aware, task-agnostic and privacy-agnostic approaches under different LDP budgets $\epsilon$, and the right side of the figure shows the MSE of power consumption for each hour, when $\epsilon=5$.

From the task loss results shown on the left side of FIG. 6, it can be seen that, for each approach, the overall task loss $\mathcal{L}$ decreases when a larger LDP budget $\epsilon$ is given. However, for a given LDP budget, the task-aware approach consistently outperforms the two benchmark approaches on overall task loss $\mathcal{L}$. The maximum improvements against the task-agnostic approach and the privacy-agnostic approach were 22.9% ($\epsilon=10$) and 11.7% ($\epsilon=5$), respectively.

For the MSE results on the right side of the figure, the LDP budget was selected as $\epsilon=5$ and the MSE of power consumption for each hour was compared. It was found that the task-aware approach achieves a lower MSE for all of the day-time hours, and a similar MSE for the night-time hours. This observation can be explained as follows. First, a higher $k_i$ is selected for the day-time hours, so the task-aware approach gives higher priority to minimizing the loss for those dimensions in x. Second, although x has 24 dimensions, the variance in each dimension can be mostly explained by several common latent dimensions, so the task-aware approach still achieves a similar MSE for the night-time hours. Finally, the task-aware approach is able to adopt different scales to different latent dimensions according to their task relevance while the privacy-agnostic approach cannot.

Real Estate Valuation and Breast Cancer Detection

The experiments for the real estate valuation problem and the breast cancer detection problem will now be described in more detail. As neither of these problems is based on a linear model with MSE task loss, Algorithm 1 of FIG. 2 is used to solve them, with Z=3 being used for both the task-aware approach and the privacy-agnostic approach for fair comparison, although it is to be appreciated that different Z values can be used.

For the real estate valuation problem, historical real estate valuation data collected from Taiwan was used, which contained 400+ instances. Here, $x \in \mathbb{R}^6$ contains six attributes that are highly related to the value of a house, including transaction date, house age, geographic coordinates, etc. And $y \in \mathbb{R}$ represents the valuation of a house. First, a one-hidden-layer feedforward neural network regression model was trained using the ground truth x and y, to serve as the task function $f$. Then, the $l_2$ loss of $\hat{y}$ and y was minimized, based on a linear encoder and decoder model.

For the breast cancer detection problem, a well-known breast cancer diagnostic dataset from Wisconsin was used, which contained 500+ instances. Here, $x \in \mathbb{R}^{30}$ contains 30 attributes that measure 10 features of a cell nucleus, and y is a binary variable that represents a diagnosis result of malignant or benign. First, a one-hidden-layer feedforward neural network classification model was trained using the ground truth x and y, to serve as the task function $f$. Then, the cross-entropy loss of $\hat{y}$ and y was minimized, with encoder and decoder both being one-hidden-layer feedforward neural networks.

Figure 7:
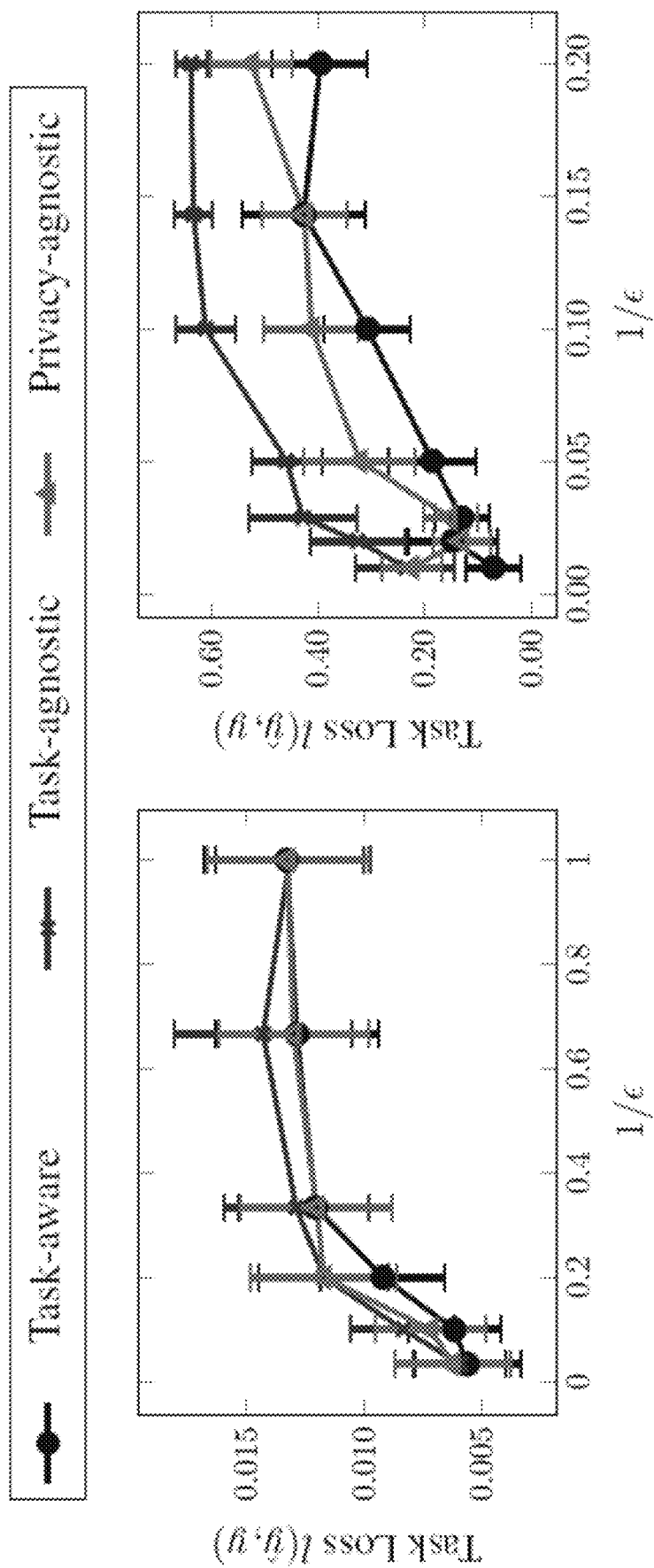
FIG. 7 shows plots of experimental results comparing task-aware, task-agnostic and privacy-agnostic approaches in example applications involving real estate valuation and breast cancer detection.

FIG. 7 compares the task loss $l(\hat{y}, y)$ for the task-aware, task-agnostic and privacy-agnostic approaches under different LDP budgets $\epsilon$ for real estate valuation, on the left side of the figure, and breast cancer detection, on the right side of the figure.

These experimental results indicate that, for both of these problems, the task-aware approach consistently outperforms the benchmark approaches on overall task loss $\mathcal{L}$ under different LDP budgets, which demonstrates the effectiveness of the example task-aware approach in these applications. The maximum improvements relative to the task-agnostic approach and the privacy-agnostic approach are 26.1% ($\epsilon=10$) and 21.2% ($\epsilon=5$) for real estate valuation, and are 70.0% ($\epsilon=100$) and 68.5% ($\epsilon=100$) for breast cancer detection.

FIG. 8 illustrates the performance of the task-aware approach under different Z values for the real estate valuation and breast cancer detection experiments. More particularly, FIG. 8 shows the task loss $l(\hat{y}, y)$ of the task-aware approach under different Z values for the real estate valuation and breast cancer detection experiments. Again, the results for the real estate valuation are on the left side of the figure, and the results for the breast cancer detection are on the right side of the figure. It can be seen that in both of these experiments, the best performance on average was obtained when Z=3, i.e., $$\frac{n}{2} = \frac{6}{2} = 3$$

for the real estate valuation and $$\frac{n}{10} = \frac{30}{10} = 3$$

for the breast cancer detection. The privacy-agnostic approach also achieves the best performance on average under the chosen Z values.

Experiment with High Dimensional Data

To illustrate that the task-aware approach also works well for high-dimensional data, such as image data, a handwritten digit recognition problem was considered using the well-known MNIST dataset.

Here, $x \in \mathbb{R}^{784}$ represents a 28×28 image of a handwritten digit, and $y \in \{0, 1, \ldots, 9\}$ is a discrete variable that represents the digit in the image. A convolutional neural network (CNN) classification model was trained using the ground truth x and y, to serve as the task function $f$. The CNN classification model comprises two consecutive convolution layers and a final linear layer. The number of input channels, the number of output channels, kernel size, stride and padding for the two convolution layers are 1, 16, 5, 1, 2 and 16, 32, 5, 1, 2 respectively, and ReLU activation and max pooling with kernel size 2 are used after each convolution layer. The final linear layer has input size 1568 and output size 1. Then, the cross-entropy loss of $\hat{y}$ and y was minimized, with a linear encoder and decoder. Values of Z=3 were used for both the task-aware approach and the privacy-agnostic approach.

Figure 9:
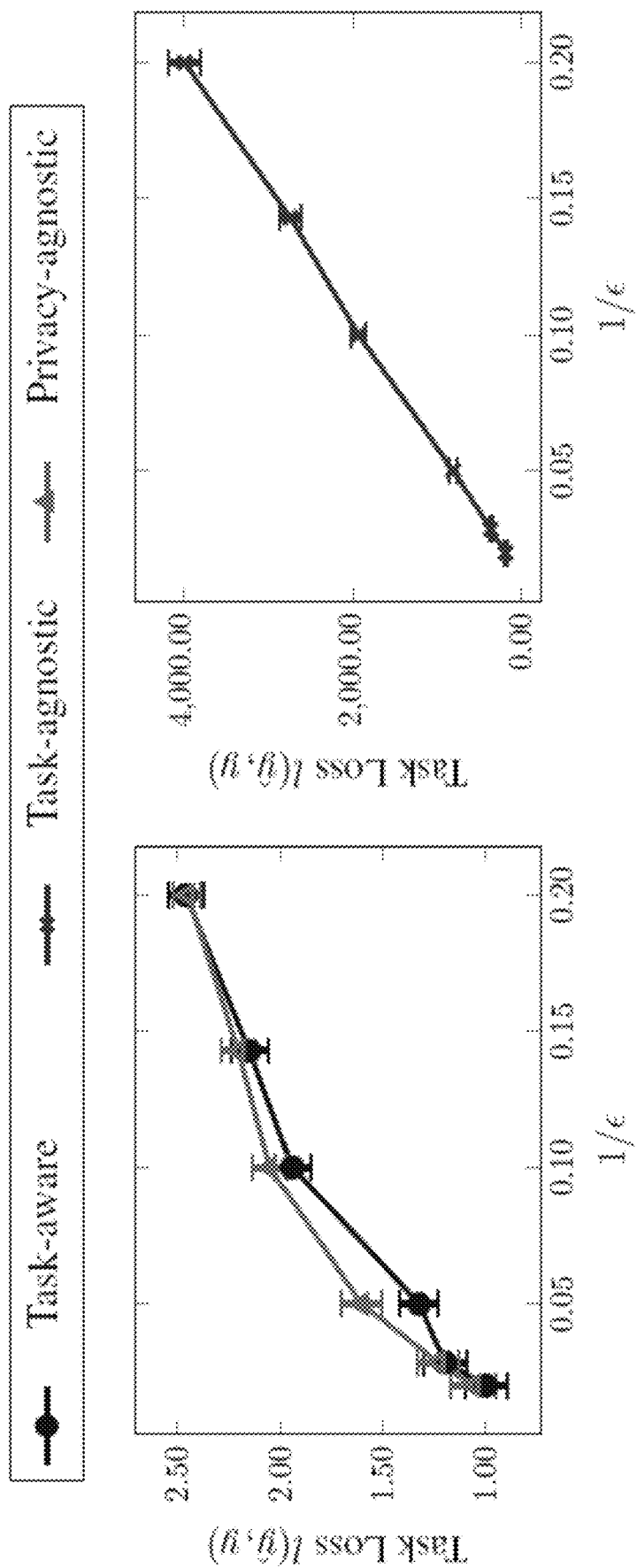
FIG. 9 shows plots of experimental results comparing task-aware, task-agnostic and privacy-agnostic approaches in an example application involving handwritten digit recognition.

FIG. 9 shows the evaluation results for the handwritten digit recognition experiment. More particularly, this figure illustrates the task loss $l(\hat{y}, y)$ under different LDP budgets $\epsilon$ for handwritten digit recognition. Since the task loss of the task-agnostic approach spans a much larger range than that of the other two approaches, it is shown in a separate sub-figure on the right side. From the two plots in the sub-figure on the left side, it can be seen that the task-aware approach in this experiment consistently outperforms the privacy-agnostic approach on overall task loss $\mathcal{L}$ under different LDP budgets $\epsilon$, which demonstrates the effectiveness of the example task-aware approach in this application. The maximum improvement relative to the privacy-agnostic approach is 21.3% ($\epsilon$=20).

Illustrative embodiments disclosed herein provide task-aware privacy preservation techniques that improve the privacy-utility trade-off for ML tasks that increasingly operate on rich, multi-dimensional user data. Some embodiments provide an analytical near-optimal solution for a general linear encoder-decoder model and MSE task loss, as well as a gradient-based learning algorithm for more general non-linear settings. Evaluation results show that illustrative embodiments of the task-aware approach outperforms benchmark approaches on overall task loss under various LDP budgets.

Again, the particular arrangements shown and described in conjunction with FIGS. 1 through 9 are considered illustrative examples only.

In other embodiments, different types of encoder-decoder networks, possibly comprising one or more neural networks, can be used. For example, in some embodiments, the encoder-decoder network may more particularly comprise an encoder-decoder neural network, in which each of the encoder and the decoder is implemented as a neural network, examples of which are described in more detail elsewhere herein. The associated task function, which in some embodiments is considered part of the encoder-decoder network, may additionally or alternatively be implemented as a neural network.

Also, the particular process operations described in illustrative embodiments herein, although illustrated as being performed sequentially, can in other embodiments be performed at least in part in parallel with one another, or in different orders. Also, additional or alternative processing operations can be used in other embodiments.

For example, other embodiments can be configured to extend to other LDP mechanisms, such as mechanisms for approximate LDP. Additionally or alternatively, task-aware privacy preservation can be provided for different groups of users in a distributed setting. The disclosed techniques can also be adapted to provide task-aware anonymized representations for multi-task learning.

Also, the particular use cases and other applications mentioned above are only examples, and illustrative embodiments can be deployed in a wide variety of other applications. In some of these applications, task-aware LDP is provided for input data in the manner disclosed herein such that the corresponding output data can be further processed in one or more ML systems, such as for training of the one or more ML systems, in a manner that preserves user privacy.

As indicated previously, embodiments disclosed herein provide significant advantages over conventional approaches.

For example, some embodiments disclosed herein configure an encoder-decoder network to learn and anonymize a task-aware latent representation of user data. Unlike conventional LDP approaches, which as indicated above are task-agnostic and often simply inject noise into all data attributes according to a given privacy budget, regardless of what data attributes are most relevant for the ultimate data processing task, illustrative embodiments herein are advantageously configured to control the manner in which noise is injected into different data attributes based at least in part on relevance of those attributes to the particular task for which the anonymized data will be used.

Experiments performed on illustrative embodiments as disclosed herein demonstrate that a task-aware privacy preservation approach in accordance with such embodiments significantly improves ultimate task accuracy compared to standard benchmark LDP approaches with the same level of privacy guarantee.

Illustrative embodiments are applicable to a wide variety of different data processing applications, including ML systems and other types of systems that can benefit from utilization of privacy-protected data.

These and other advantages referred to herein are illustratively present in some embodiments, but need not be present in all embodiments. Other embodiments can provide different arrangements of advantages, depending upon their particular implementations.

The particular configurations as shown in the figures are non-limiting and should be considered illustrative examples only. Numerous other types of system architectures can be used in other embodiments. Also, other types of networks can be used in other embodiments. Accordingly, illustrative embodiments herein are not limited to use with encoder-decoder neural networks or other particular types of neural networks.

Information processing systems disclosed herein, such as system 100 and system 300, can be configured to support a wide variety of distinct applications, in numerous diverse contexts. For example, as indicated previously, the disclosed techniques are applicable to a wide variety of different data privacy preservation applications and contexts, including applications that involve ML processing of privacy-preserved user data.

It is therefore to be appreciated that the particular applications described herein are examples only, intended to demonstrate utility of illustrative embodiments, and should not be viewed as limiting in any way.

As indicated above, the particular arrangements shown and described in conjunction with FIGS. 1 through 9 are presented by way of illustrative example only, and numerous alternative embodiments are possible. The various embodiments disclosed herein should therefore not be construed as limiting in any way. Numerous alternative arrangements of processing devices and task-aware privacy preservation systems can be utilized in other embodiments. Those skilled in the art will also recognize that alternative processing operations and associated system configurations can be used in other embodiments.

It is therefore possible that other embodiments may include additional or alternative system elements, relative to the entities of the illustrative embodiments. Accordingly, the particular system configurations and associated algorithm implementations can be varied in other embodiments.

A given processing device or other component of an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, a TPU, a GPU, an ALU, a DSP, or other similar processing device component, as well as other types and arrangements of processing circuitry, in any combination. For example, at least a portion of the functionality of at least one task-aware privacy preservation system provided by one or more processing devices as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

As mentioned previously, articles of manufacture comprising such processor-readable storage media are considered embodiments of the invention. The term "article of manufacture" as used herein should be understood to exclude transitory, propagating signals. Other types of computer program products comprising processor-readable storage media can be implemented in other embodiments.

In addition, embodiments of the invention may be implemented in the form of integrated circuits comprising processing circuitry configured to implement processing operations associated with implementation of at least portions of a task-aware privacy preservation system.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory. A given such network can illustratively include, for example, a global computer network such as the Internet, a WAN, a LAN, a satellite network, a telephone or cable network, a cellular network such as a 4G or 5G network, a wireless network implemented using a wireless protocol such as Bluetooth, WiFi or WiMAX, or various portions or combinations of these and other types of communication networks.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

A given processing platform implementing a task-aware privacy preservation system as disclosed herein can alternatively comprise a single processing device, such as a computer or server. It is also possible in some embodiments that one or more such system elements can run on or be otherwise supported by cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality disclosed herein can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It should again be emphasized that the embodiments of the invention as described herein are intended to be illustrative only. Other embodiments of the invention can be implemented utilizing a wide variety of different types and arrangements of information processing systems, task-aware privacy preservation systems and processing devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. A method comprising:
applying an input data sample to an encoder of an encoder-decoder network to generate a corresponding latent representation;
combining the latent representation from the encoder with noise;
applying the combined latent representation and noise to a decoder of the encoder-decoder network to generate an estimated data sample; and
outputting the estimated data sample;
wherein respective sets of parameters of the encoder and decoder of the encoder-decoder network are configured based at least in part on an iterative optimization process utilizing a task loss determined from a task function that relates the input data sample to a task output; and wherein the method is performed by at least one processing device comprising a processor coupled to a memory.

2. The method of claim 1 wherein a given iteration of the iterative optimization process comprises:
applying an instance of the estimated data sample to the task function to generate an estimated task output;
determining a loss measure based at least in part on the estimated task output; and
adjusting at least one of the respective sets of parameters of the encoder and decoder based at least in part on the loss measure.

3. The method of claim 2 wherein adjusting at least one of the respective sets of parameters of the encoder and decoder based at least in part on the loss measure comprises:
updating at least one parameter in the set of parameters of the encoder utilizing a first negative gradient of the loss measure; and
updating at least one parameter in the set of parameters of the decoder utilizing a second negative gradient of the loss measure, the second negative gradient of the loss measure being different than the first negative gradient of the loss measure.

4. The method of claim 3 wherein the first negative gradient has an associated regularization term and the second negative gradient does not have an associated regularization term.

5. The method of claim 2 wherein the given iteration of the iterative optimization process further comprises at least one of:
computing a sensitivity value for the encoder; and
selecting a noise vector for combining with an instance of the latent representation.

6. The method of claim 1 wherein at least one of the encoder, the decoder and the task function is implemented as a linear function.

7. The method of claim 1 wherein at least one of the encoder, the decoder and the task function is implemented as a neural network.

8. The method of claim 1 wherein combining the latent representation from the encoder with noise comprises combining the latent representation with a noise vector selected from a specified noise domain.

9. The method of claim 1 wherein the encoder is implemented at least in part on a first processing device, and the decoder is implemented at least in part on a second processing device that communicates with the first processing device over at least one network.

10. The method of claim 1 wherein outputting the estimated data sample comprises providing the estimated data sample from the encoder-decoder network to a machine learning system for further processing with one or more other estimated data samples generated from one or more other input data samples.

11. The method of claim 1 wherein the estimated data sample provides local differential privacy relative to the input data sample within a specified privacy budget.

12. The method of claim 1 wherein the task function relating the input data sample to the task output is determined in an offline training phase.

13. The method of claim 1 wherein the task function is represented at least in part in the form of a task matrix.

14. The method of claim 1 wherein the encoder-decoder network comprises an encoder-decoder neural network.

15. A system comprising:
at least one processing device comprising a processor and a memory;
the at least one processing device being configured:
to apply an input data sample to an encoder of an encoder-decoder network to generate a corresponding latent representation;
to combine the latent representation from the encoder with noise;
to apply the combined latent representation and noise to a decoder of the encoder-decoder network to generate an estimated data sample; and
to output the estimated data sample;
wherein respective sets of parameters of the encoder and decoder of the encoder-decoder network are configured based at least in part on an iterative optimization process utilizing a task loss determined from a task function that relates the input data sample to a task output.

16. The system of claim 15 wherein a given iteration of the iterative optimization process comprises:
applying an instance of the estimated data sample to the task function to generate an estimated task output;
determining a loss measure based at least in part on the estimated task output; and
adjusting at least one of the respective sets of parameters of the encoder and decoder based at least in part on the loss measure.

17. The system of claim 16 wherein adjusting at least one of the respective sets of parameters of the encoder and decoder based at least in part on the loss measure comprises:
updating at least one parameter in the set of parameters of the encoder utilizing a first negative gradient of the loss measure; and
updating at least one parameter in the set of parameters of the decoder utilizing a second negative gradient of the loss measure, the second negative gradient of the loss measure being different than the first negative gradient of the loss measure.

18. A computer program product comprising a non-transitory processor-readable storage medium having stored therein program code of one or more software programs, wherein the program code, when executed by at least one processing device comprising a processor coupled to a memory, causes the at least one processing device:
to apply an input data sample to an encoder of an encoder-decoder network to generate a corresponding latent representation;
to combine the latent representation from the encoder with noise;
to apply the combined latent representation and noise to a decoder of the encoder-decoder network to generate an estimated data sample; and
to output the estimated data sample;
wherein respective sets of parameters of the encoder and decoder of the encoder-decoder network are configured based at least in part on an iterative optimization process utilizing a task loss determined from a task function that relates the input data sample to a task output.

19. The computer program product of claim 18 wherein a given iteration of the iterative optimization process comprises:
applying an instance of the estimated data sample to the task function to generate an estimated task output;
determining a loss measure based at least in part on the estimated task output; and
adjusting at least one of the respective sets of parameters of the encoder and decoder based at least in part on the loss measure.

20. The computer program product of claim 19 wherein adjusting at least one of the respective sets of parameters of the encoder and decoder based at least in part on the loss measure comprises:
   updating at least one parameter in the set of parameters of the encoder utilizing a first negative gradient of the loss measure; and
   updating at least one parameter in the set of parameters of the decoder utilizing a second negative gradient of the loss measure, the second negative gradient of the loss measure being different than the first negative gradient of the loss measure.

* * * * *